(12) United States Patent
Billings et al.

(10) Patent No.: US 9,932,260 B2
(45) Date of Patent: Apr. 3, 2018

(54) METHODS OF MAKING AN OPTICAL FIBER, AND OPTICAL FIBER

(71) Applicant: Corning Incorporated, Corning, NY (US)

(72) Inventors: Kenneth Duane Billings, Wilmington, NC (US); Dana Craig Bookbinder, Corning, NY (US); Paul Andrew Chludzinski, Hampstead, NC (US); Robert Clark Moore, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/337,591

(22) Filed: Oct. 28, 2016

(65) Prior Publication Data
US 2017/0297947 A1    Oct. 19, 2017

Related U.S. Application Data

(60) Provisional application No. 62/248,376, filed on Oct. 30, 2015.

(51) Int. Cl.
   *C03B 37/027* (2006.01)
   *C03B 37/025* (2006.01)
   (Continued)

(52) U.S. Cl.
   CPC .... *C03B 37/02718* (2013.01); *C03B 37/0253* (2013.01); *G02B 6/03627* (2013.01);
   (Continued)

(58) Field of Classification Search
   None
   See application file for complete search history.

(56) References Cited

U.S. PATENT DOCUMENTS

| 4,181,403 A | 1/1980 | Macedo et al. |
| 6,565,775 B2 | 5/2003 | Dubois et al. |

(Continued)

FOREIGN PATENT DOCUMENTS

| JP | 2004043231 A | 2/2004 |
| JP | 2005281090 A | 10/2005 |
| WO | 2015020861 A1 | 2/2015 |

OTHER PUBLICATIONS

Glicksman, L.R., "The Cooling of Glass Fibers," Glass Technology, vol. 5, No. 28, 1968, p. 131-138.

(Continued)

*Primary Examiner* — Jerry Rahll
(74) *Attorney, Agent, or Firm* — Svetlana Z. Short

(57) ABSTRACT

According to some embodiments a method of processing an optical fiber comprises the steps of: (i) drawing the fiber at a drawing rate of at least 30 m/sec; and (ii) cooling the drawn fiber in a gas at an average cooling rate less than 5000° C./s, such that said cooling reduces the temperature of the fiber from an entering temperature in the range between 1500° C. and 1700° C. to another temperature in the range between 1200° C. and 1400° C., the gas being at a temperature between 800° C. and 1500° C.; and the thermal conductivity κ of the gas being not greater than $1.5 \times 10^{-4}$ cal/cm-s-K for at least one temperature within a range of 800° C. to 1500° C. at one atm (atmosphere) pressure absolute.

25 Claims, 16 Drawing Sheets

(51) Int. Cl.
*G02B 6/036* (2006.01)
*C03C 25/10* (2018.01)
*G02B 6/02* (2006.01)

(52) U.S. Cl.
CPC ...... *C03B 2205/44* (2013.01); *C03B 2205/55* (2013.01); *C03C 25/106* (2013.01); *G02B 6/02009* (2013.01)

(56) References Cited

U.S. PATENT DOCUMENTS

| | | |
|---|---|---|
| 7,737,971 B2 | 6/2010 | Kitagawa |
| 7,937,971 B2 | 5/2011 | Costello, III et al. |
| 8,074,474 B2 | 12/2011 | Filippov et al. |
| 8,989,545 B2 | 3/2015 | Nakanishi et al. |
| 2005/0259932 A1 | 11/2005 | Nagayama et al. |
| 2006/0101861 A1 | 5/2006 | Nagayama et al. |
| 2009/0139270 A1 | 6/2009 | Filippov et al. |
| 2009/0158779 A1 | 6/2009 | Faler et al. |
| 2014/0328565 A1 | 11/2014 | Sakabe et al. |
| 2015/0040614 A1 | 2/2015 | Dunwoody et al. |
| 2015/0251945 A1 | 9/2015 | Nakanishi et al. |

OTHER PUBLICATIONS

International Search Report and Written Opinion PCT/US2016/059033 dated Feb. 20, 2017.

Kim et al., "Fictive Temperature Measurement of Single Mode Optical-Fiber Core and Cladding," J. of Lightwave Technology; vol. 19, No. 8, Aug. 2001, p. 1155-1158.

US 9,932,260 B2

METHODS OF MAKING AN OPTICAL FIBER, AND OPTICAL FIBER

This application claims the benefit of priority under 35 U.S.C. § 119 of U.S. Provisional Application Ser. No. 62/248,376 filed on Oct. 30, 2015, the content of which is relied upon and incorporated herein by reference in its entirety.

FIELD OF THE DISCLOSURE

This disclosure generally pertains to optical fiber manufacturing methods, and to optical fibers.

BACKGROUND OF THE DISCLOSURE

Manufacturing methods for producing optical fibers typically include drawing optical fiber from a glass perform that is heated in a draw furnace, cooling the drawn fiber, and coating the fiber after it has sufficiently cooled. The process parameters employed by the fiber manufacturing process may have a significant impact on the resultant performance characteristics of the drawn fiber. In the manufacturing of the glass optical fibers, the optical preforms are heated to temperatures much above the glass softening point and then drawn at large draw down ratios to form glass optical fibers of about 125 μm in diameter. The high draw temperatures, large draw down ratios and fast draw speeds, can result in fiber diameter variability, defects in the glass matrix, increased Rayleigh scatter and increased attenuation. Thus, it is important to develop optical fiber manufacturing methods that provide high drawing rates while minimizing fiber diameter variability and improving fiber attenuation.

SUMMARY

The present disclosure provides a method of making optical fibers.

According to some embodiments a method of processing an optical fiber comprises the steps of:
(i) drawing the fiber at a drawing rate of at least 30 m/sec; and
(ii) cooling the drawn fiber in a gas at an average cooling rate less than 5000° C./s, such that the cooling reduces the temperature of the fiber from an entering temperature in the range between 1500° C. and 1700° C. to another temperature in the range between 1200° C. and 1400° C., the gas being at a temperature between 800° C. and 1500° C.; and the thermal conductivity κ of the gas being not greater than $1.5 \times 10^{-4}$ cal/cm-s-K for at least one temperature within a range of 800° C. to 1500° C. at one atm (atmosphere) pressure absolute. According to at least some of the embodiments disclosed herein the gas or has an average thermal conductivity κ (i.e., $\kappa_{ave} = \kappa max + \kappa min)/2$) of not greater than $1.5 \times 10^{-4}$ cal/cm-s-K within the temperature range of 800° C. to 1500° C. According to at least some of the embodiments disclosed herein the gas or has an thermal conductivity κ of not greater than $1.6 \times 10^{-4}$ cal/cm-s-K at 1 atm pressure absolute (for example $1.5 \times 10^{-4}$ cal/cm-s-K or less) for all temperatures within the temperature range of 800° C. to 1500° C. According to some embodiments the thermal conductivity κ of the gas is not greater than $1.5 \times 10^{-4}$ cal/cm-s-K for all temperatures within a range of 800° C. to 1450° C. at 1 atm pressure absolute. According to some exemplary embodiments the average cooling rate is between 1000° C./s and 4000° C./s. According to some exemplary embodiments the average cooling rate is between 1400° C./s and 3000° C./s. According to some exemplary embodiments the gas is at: (i) a temperature that is between 1000° C. and 1300° C., and (ii) pressure of 0.025 atm to 1 atm, absolute. According to exemplary embodiments described herein the fiber drawing rate is between 30 m/sec and 100 m/sec.

According to some embodiments a method of processing an optical fiber comprises the steps of:
(i) drawing the fiber at a drawing rate of at least 30 m/sec; and
(ii) cooling the drawn fiber in a gas at an average cooling rate less than 5000° C./s (e.g., >6000° C./s, or even >6500° C./s) such that the cooling reduces the temperature of the fiber from an entering temperature in the range between 1500° C. and 1700° C. to another temperature in the range between 1200° C. and 1400° C., the gas being at a temperature between 800° C. and 1500° C.; and the thermal conductivity κ of the gas being not greater than $1.6 \times 10^{-4}$ cal/cm-s-K for all temperatures within a range of 800° C. to 1500° C. at 1 atm pressure absolute. According to some exemplary embodiments the average cooling rate is between 1000° C./s and 4000° C./s. According to some exemplary embodiments the average cooling rate is between 1400° C./s and 3000° C./s.

According to at least some embodiments the method further includes cooling the drawn fiber at a first cooling rate, the first cooling rate being greater than 5000° C./s, the cooling at the first cooling rate reducing the fiber temperature from a first temperature $T_1$ to a second temperature $T_2$, such that $T_2 < T_1$, the first temperature $T_1$ being in the range from 1800° C. to 2100° C. and the second temperature $T_2$ being in the range from 1600° C. to 1800° C.; and then subsequently cooling the drawn fiber in said gas at the average cooling rate less than 5000° C./s, wherein said the entrance temperature is less than or equal to $T_2$.

According to some embodiments, the gas is Ar, Kr, Xe, and/or Rn, or a mixture thereof, and the drawing rate is 30 msec to 100 msec (e.g., 30-80 msec, or 40 to 80 msec, or therebetween). According to some embodiments, the cooling in the gas reduces the temperature of the fiber by at least 100° C. (i.e., according to at least some embodiments the entering temperature minus said another temperature is ≥100° C.). According to some embodiments, the cooling in the gas reduces the temperature of the fiber by at least 200° C.

According to at least some of the exemplary embodiments described herein, the thermal conductivity κ of the gas is not greater than $1.6 \times 10^{-4}$ cal/cm-s-K at all temperatures within a range of 800° C. to 1500° C.; and the temperature of the gas during cooling of the drawn fiber is between 800° C. and 1500° C. (e.g., 800° C.-1300° C., or 1000° C.-1250° C., or 1100° C. to 1250° C.). In some embodiments, the temperature of gas or gas mixture during cooling of the drawn fiber is between 1000° C. and 1300° C. In some embodiments, the average thermal conductivity of the gas is not greater than $1.5 \times 10^{-4}$ cal/cm-s-K at all temperatures within a range of 800° C. to 1450° C.; and the temperature of the gas during cooling of the drawn fiber is between 800° C. and 1500° C. (e.g., 800° C.-1300° C., or 1000° C.-1250° C., or 1100° C. to 1250° C.).

According to at least some of the exemplary embodiments described herein a method of processing an optical fiber comprises:

(i) providing the fiber, the fiber having a temperature of a first temperature $T_1$;

(ii) cooling the fiber at a first cooling rate, the first cooling rate being greater than 5000° C./s, said cooling at the first cooling rate reducing the fiber temperature from the first temperature $T_1$ to a second temperature $T_2$, such that $T_2<T_1$, the first temperature $T_1$ being in the range from 1800° C. to 2100° C. and the second temperature $T_2$, being in the range from 1600° C. to 1800° C.; and (iii) cooling said fiber in a gas at a second cooling rate, at a gas temperature between 800° C. and 1500° C., the second cooling rate being less than 5000° C./s, said cooling at said second cooling rate reducing the temperature of said fiber from a third temperature $T_3$ to a fourth temperature $T_4$, wherein $T_3 \leq T_2$, the third temperature $T_3$ being in the range from 1500° C. to 1700° C. and the fourth $T_4$ temperature being in the range from 1200° C. to 1400° C., and wherein the thermal conductivity κ of the gas is not greater than $1.6 \times 10^{-4}$ cal/cm-s-K, for all temperatures within a range of 800° C. to 1500.

According to some embodiments, the optical fiber includes a glass core and a glass cladding. According to at least some embodiments the core is a silica based core doped at least one of: Ge, Cl, $K_2O$. According to at least some embodiments the fiber has a mode field diameter MFD at 1310 nm between 8.2 microns and 9.5 microns, cable cutoff of less than 1260 nm and attenuation at 1550 nm of less than 0.18 dB/km. According to at least some embodiments the core is updoped relative to silica and has a relative refractive difference with respect to silica of 0.1% to 0.45% (e.g., 0.25% to 0.45%). According to at least some embodiments the fiber core has a residual stress that is a tensile stress with a value between about 10 MPa and about 40 MPa. According to at least some embodiments the optical fiber comprising glass core containing $GeO_2$ surrounded by silica based cladding and fiber has a fictive temperature less than 1450° C. and attenuation at 1550 nm of less than 0.18 dB/km. According to some embodiments the fictive temperature of the fiber is less than 1300° C., or even less than 1200° C.

According to at least some embodiments, the method may include drawing the fiber at a rate of at least 30 m/sec and cooling the fiber at an average cooling rate less than 5000° C./s, where the cooling reduces the temperature of the fiber from an entering temperature in the range from 1500° C. to 1700° C. to another temperature in the range from 1200° C. to 1400° C., in a gas having a thermal conductivity over the entire temperature range of 800° C. to 1500° C. of less than $1.6 \times 10^{-4}$ cal/cm-s-K, at a pressure that is situated within the range of 0.025 atm to 1 atm, absolute. E.g., 0.25 atm, 0.5 atm, or 0.75 atm pressure, absolute. According to at least some embodiments, the method may include drawing the fiber at a rate of at least 30 m/sec and cooling the fiber at an average cooling rate less than 5000° C./s, where the cooling reduces the temperature of the fiber from an entering temperature in the range from 1500° C. to 1700° C. to another temperature in the range from 1200° C. to 1400° C., in a gas having a thermal conductivity over the entire temperature range of 800° C. to 1450° C. of less than $1.5 \times 10^{-4}$ cal/cm-s-K at 1 atm pressure, absolute.

According to at least some embodiments, the method may include drawing the fiber at a rate of at least 30 msec and cooling the fiber at an average cooling rate less than 5000° C./s, where the cooling reduces the temperature of the fiber from an entering temperature in the range from 1500° C. to 1700° C. to another temperature in the range from 1200° C. to 1400° C., in a gas having an average thermal conductivity over the temperature range of 800° C. to 1500° C. of less than $1.5 \times 10^{-4}$ cal/cm-s-K. In some embodiments, the gas has the average thermal conductivity over the temperature range of 800° C. to 1500° C. between $0.25 \times 10^{-4}$ cal/cm-s-K and $1.5 \times 10^{-4}$ cal/cm-s-K.

According to at least some embodiments, the method may include drawing the fiber at a rate of at least 30 msec and cooling the fiber at an average cooling rate less than 5000° C./s, where the cooling reduces the temperature of the fiber from an entering temperature in the range from 1500° C. to 1700° C. to another temperature in the range from 1200° C. to 1400° C., in a gas having a maximum thermal conductivity over the temperature range of 800° C. to 1500° C. of less than $1.6 \times 10^{-4}$ cal/cm-s-Kat when measured 1 atm pressure absolute. In some embodiments, the gas has the maximum thermal conductivity over the temperature range of 800° C. to 1500° C. between $0.25 \times 10^{-4}$ cal/cm-s-K and $1.6 \times 10^{-4}$ cal/cm-s-K (e.g. $0.25 \times 10^{-4}$ cal/cm-s-K to $1.55 \times 10^{-4}$ cal/cm-s-K, or $0.5 \times 10^{-4}$ cal/cm-s-K to $1.55 \times 10^{-4}$ cal/cm-s-K), when measured at 1 atm pressure absolute.

According to some embodiments, the gas is Ar, Kr, Xe, and/or Rn, or a mixture thereof. According to some embodiments, the fiber drawing rate is 30 msec to 100 msec (e.g., 30 msec to 80 m/sec). According to some embodiments, the fiber cooling in the gas reduces the temperature of the fiber by at least 100° C. According to at least some embodiments, the fiber cooling in the gas reduces the temperature of the fiber by at least 200° C. According to some embodiments the temperature of gas during cooling of the fiber is between 800° C. and 1500° C. (e.g., 800° C.-1300° C., or 1000° C.-1250° C., or 1100° C. to 1250° C.). In some embodiments, the temperature of gas or gas mixture during cooling of the fiber is between 1000° C. and 1300° C.

According to some embodiments, the method of processing an optical fiber comprises: (i) drawing the fiber at a rate of at least 30 msec; and (ii) cooling the drawn fiber at an average cooling rate of less than 5000° C./s, such that the cooling reduces the temperature of the fiber from a temperature in the range from 1500° C. to 1700° C. to a temperature in the range from 1200° C. to 1400° C. in a gas or gas mixture having an average thermal conductivity over the temperature range of 800° C. to 1500° C. that is between $0.5 \times 10^{-4}$ cal/cm-s-K and $1.5 \times 10^{-4}$ cal/cm-s-K. According to some embodiments the gas is Ar, Kr, Xe, and/or Rn, or a mixture thereof; the drawing rate is 30 m/sec to 100 m/sec (e.g., 40 m/sec to 100 m/sec, or 40 m/sec to 80 m/sec). According to some embodiments and said cooling in said gas is performed at a cooling rate between 1200° C./s and 5000° C., or between 1300° C./sec and 5000° C./sec, for example between 1400° C./s and 3000° C./s, or between 1450° C./sec and 2500° C./sec, or between 1450° C./sec and 2300° C./sec, or between 1625° C./sec and 2500° C./sec.

According to some embodiments fiber cooling occurs for between 0.08 sec and 1 sec. According to some other embodiments fiber cooling occurs for a time larger than 0.1 sec. According to some other embodiments fiber cooling occurs for a time larger than 0.2 sec. According to some other embodiments fiber cooling occurs for a time larger than 0.3 sec.

The method may include heating a fiber preform above its softening point, drawing a fiber from the heated preform and passing the fiber through two treatment stages. The fiber may enter a first treatment stage at a temperature between 1800° C. and 2100° C. and experience an average cooling rate greater than 5000° C./s in the first treatment stage, may exit the first treatment stage at a temperature between 1600°

C. and 1800° C. and may experience an average cooling rate less than 5000° C./s in the second treatment stage. The fiber may enter a second treatment stage downstream from the first treatment stage at a temperature between 1500° C. and 1700° C., and exit the second treatment stage at a temperature between 1200° C. and 1400° C. According to the exemplary embodiments described herein, the average gas temperature in the second stage is between 800° C. and 1500° C. (e.g., 800° C.-1300° C., or 1000° C.-1250° C.). According to the other exemplary embodiments described herein, the average gas temperature in the second stage is between 1000° C. and 1300° C.

According to some embodiments method of manufacturing an optical fiber comprises:
(i) heating a fiber preform above its softening point,
(ii) drawing the optical fiber from the heated preform at a draw rate of at least 30 m/sec; and
(iii) passing the optical fiber through at least two treatment stages, such that
   (a) the fiber enters a first treatment stage at a temperature between 1800° C. and 2100° C. and experiences an average cooling rate greater than 5000° C./s in the first treatment stage;
   (b) the optical fiber exits the first treatment stage at a temperature between 1600° C. and 1800° C.;
   (c) the optical fiber enters a second treatment stage downstream from the first treatment stage at a temperature between 1500° C. and 1700° C. and experiences an average cooling rate less than 5000° C./s in the second treatment stage in a gas or gas mixture having
      a. a temperature between 800° C. and 1500° C. and
      b. a thermal conductivity κ that is not greater than $1.6 \times 10^{-4}$ cal/cm-s-K for all temperatures within a range of 800° C. to 1500° C. at 1 atm pressure absolute, and
      c. the optical fiber exits the second treatment stage at a temperature between 1200° C. and 1400° C.

The method(s) may also include redirecting the fiber with a fluid bearing device or an air-turn device. The redirection may redirect the fiber from a substantially vertical direction to a substantially horizontal direction. In another embodiment, the redirection may redirect the fiber from a vertical direction to an opposite vertical direction. The redirection may occur after the fiber has exited the second treatment stage or after the surface temperature of the fiber has been cooled to less than 1000° C.

The embodiments of the present disclosure further includes: drawing of an optical fiber and cooling the optical fiber as disclosed here, wherein the optical fiber is a silica based glass fiber comprises:
(i) a silica based glass core containing at least one of: $GeO_2$, Cl, K; the core having a relative refractive difference with respect to silica of 0.1% to 0.45%, the core having a residual stress that is a tensile stress with a value between 0 MPa and 15 MPa;
(ii) a silica based glass cladding surrounding the core; and
(iii) a polymeric coating surrounding the cladding.

According to some embodiments the core at least one region that has residual tensile stress with a value between 0.1 MPa and 15 MPa (e.g., 1 to 10 MPa, or 2 to 10 MPa). According to some embodiments the cladding has at least one region having a residual stress that is a tensile stress with a value between 5 MPa to 40 MPa, an in some embodiments, for example, 10 MPa to 40 MPa, 5 to 20 MPa, 10 to 20 MPa, or 8 to 20 MPa.

According to some embodiments the core has a relative refractive difference with respect to silica of 0.1% to 0.45%, for example 0.25% to 0.45%.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
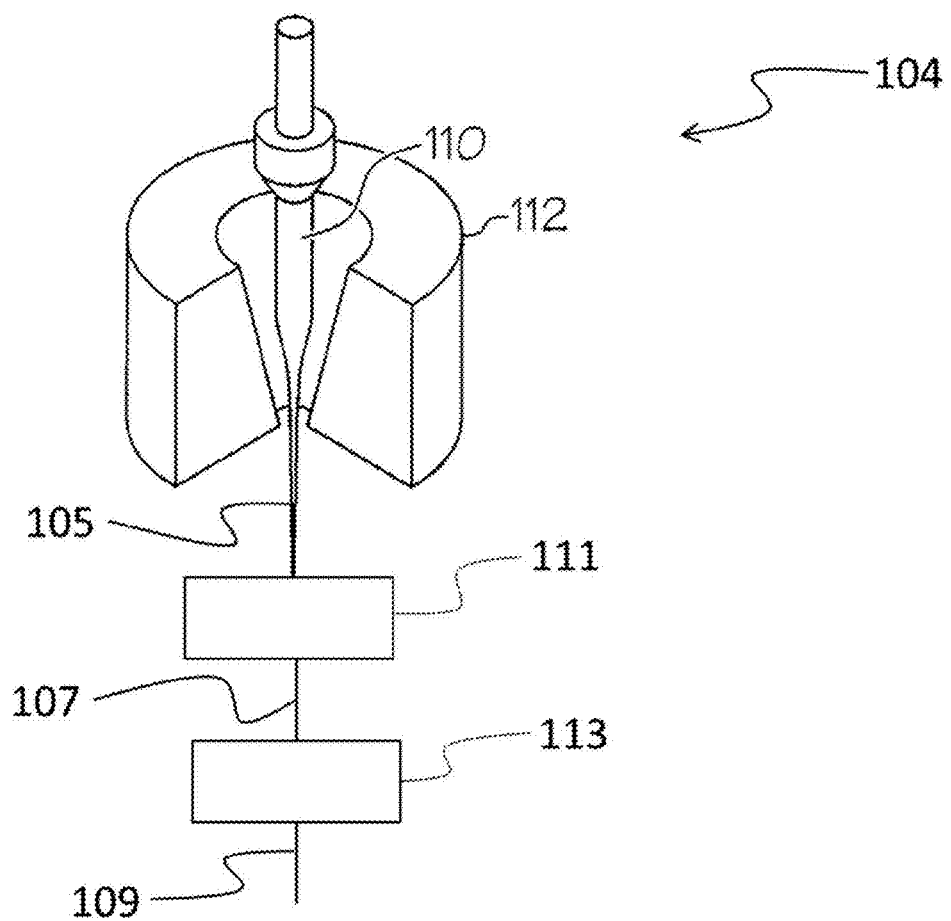
FIG. 1 depicts an optical fiber production system with a glass heating source and two spaced-apart treatment stages.

The present disclosure also describes a method for making and processing optical fibers. It is noted that the units for thermal conductivity κ of the gas are provided at specified temperature(s) described herein, and are in units of cal/cm·sec·° Kelvin (also referred to herein as cal/cm-s-K).

Slower cooling of fiber when the fiber is in the temperature range from 1700° C. to 1200° C. results in increased glass relaxation in the glass transition region, a lower fiber average fictive temperature and lower fiber attenuation. However, given the same length L of the fiber cooling zone (e.g., for a given length second furnace 113') as fiber draw rate increases >30 m/sec, the fiber cooling rate within this temperature range is significantly increased, which increases fictive temperature, and increases fiber attenuation. One way to counteract this is to increase the operating temperature of the cooling device to decrease the fiber cooling rate, but this option is not always feasible. We discovered that slowing the fiber cooling (reducing the fiber cooling rate) while the fiber cools from about 1700° C. to about 1200-1400° C. can be achieved by properly selecting the gas or gas mixtures surrounding the fiber during cooling, as described below, which can advantageously result in an improvement in fiber attenuation. The exemplary optical fiber embodiments disclosed herein advantageously have low attenuation of optical signals of <0.184 dB/km at 1550 nm, for example 0.178 dB/km to 0.184 dB/km or 0.179 dB/km to 0.181 dB/km at a 1550 nm wavelength. In some embodiments, the optical fiber has an attenuation at 1550 nm of less than 0.18 dB/km (e.g., between 0.15 dB/km and 0.18 dB, or between 0.15 dB/km and 0.17 dB).

According to some embodiments, the fibers have attenuation of less than 0.324 dB/km at 1310 nm, or even less than 0.31 dB/km at 1310 nm. For example, for some embodiments attenuation is, for example, 0.28 dB/km to 0.324 dB/km at 1310 nm, or 0.29 dB/km to 0.31 dB/km at 1310 nm, or 0.30 dB/km to 0.324 dB/km at 1310 nm, or 0.30 dB/km to 0.32 dB/km at 1310, or 0.31 dB/km to 0.324 dB/km at 1310 nm.

The present methods may include drawing a fiber from a heated glass source, and subjecting the fiber to cooling at different rates in two treatment regions (for example, two treatment stages) positioned downstream from the heated glass source. The heated glass source may be an optical fiber preform heated in a draw furnace.

According to some embodiments described herein the fiber may enter a first treatment region (fast cooling region) with a temperature $T_1$ in the range from 1800° C. to 2100° C. and may exit the first treatment region with a fiber temperature $T_2$ in the range from 1600° C. to 1800° C., for example in the range from 1675° C. to 1800° C. The residence time of the fiber in the first treatment region (determined as the length L1 of the first treatment region divided by fiber draw speed) may, for example, be at least 0.005 sec, or between 0.005 sec and 0.05 sec. As used herein, unless stated otherwise, cooling rate refers to average cooling rate, which is defined as the difference between the temperature of the fiber at the entrance and exit of the treatment region divided by the residence time of the fiber in the treatment region. The average cooling rate in the first treatment region is greater than 5000° C./s, for example between 5000° C./s and 20000° C./s, and in some embodiments between 5000° C./s and 15000° C./s. For example, in some embodiments the average cooling rate in the first treatment region is between 12000° C./s and 18000° C./s or between 14000° C./s and 16000° C./s (e.g., about 15000° C./s). According to some exemplary embodiments the gas or gas mixture surrounding the fiber in the first treatment region is air or He. The average temperature of the gas or gas mixture surrounding the fiber in the first treatment region (operable temperature in the first treatment region) is, for example, between 175° C. and 500° C., or between 200° C. and 500° C., or for example about 300° C.

After exiting the first treatment region, the fiber enters a second treatment region with a temperature $T_3$ in the range from 1500° C. to 1700° C. and exits the second treatment region with a fiber temperature $T_4$ in the range from 1100° C. to 1400° C., or in some embodiments between 1200° C. and 1400° C., for example in the range from 1200° C. to 1300° C. That is, the temperature of the fiber at the entrance of the second treatment region may be in the range from 1500° C. to 1700° C. and the temperature of the fiber at the exit of the second treatment region is not greater than 1400° C., or may be less than 1300° C., or may be about 1200° C.-1300° C.

The residence time (determined as the length L2 of the second treatment region divided by fiber draw speed) of the fiber in the second treatment region may be at least 0.08 sec, or at least 0.1 sec, or at least 0.2 sec, or even at least 0.3 sec, for example in some embodiments between 0.08 sec and 1 sec. According to some embodiments the fiber draw speed is in the range of 30 msec to 80 msec.

The average cooling rate of the fiber in the second treatment region (slow cooling region) is less than 5000° C./s, or less than 4000° C./s, or less than 3000° C./s, or less than 2000° C./s, or between 1000° C./s and 4000° C./s, or between 1000° C./s and 3000° C./s. For example, according to some embodiments, the average cooling rate of the fiber in the second treatment region is 1000° C./s-4000° C./s, or 1000° C./s-3000° C./s, or 1400° C./s-3000° C./s, or 1000° C./s-2000° C./s, or, for example, 1300° C./s to 1700° C./s, or 1400° C./s to 1600° C./s. The average temperature of the gas surrounding the fiber during cooling in the second treatment region (also referred to herein as operable, or operating temperature range of the second treatment region) may be between 800° C. and 1500° C., for example between 900° C. to 1300° C., or between 1000° C. and 1250° C. For example, the second treatment region may be inside a heated furnace (also referred to as second furnace herein) or a slow cooling device (SCD), and the average temperature of the gas surrounding the fiber is the average temperature of gas in the furnace or the SCD, or the operating temperature of the second furnace or SCD. According to some embodiments, the average temperature of the gas surrounding the fiber during cooling in the second treatment region is between 800° C. and 1300° C., and preferably between 1000° C. and 1300° C., and for some embodiments preferably between 1100° C. and 1250° C. According to the exemplary embodiments the fiber draw speed (also referred to as a draw rate herein) is >30 msec, for example 30-100 msec, 40-80 msec, or 50-80 msec.

The first and the second treatment regions may include cooling the fiber in a gas ambient. For example, the gas ambient of the second region may include or may consist essentially of a gas or mixture of gases having an average thermal conductivity $\kappa_{ave}$ that is less than $1.5 \times 10^{-4}$ cal/cm-s-° K (i.e. $\kappa_{ave} < 1.5 \times 10^{-4}$ cal/cm·sec·° Kelvin) over the operable temperature range of the second treatment region. The conductivity of the gas at this temperature range can be measured at 1 atmosphere pressure, absolute. (The operable temperature of the second treatment region corresponds to the temperature of the gas or gas mixture utilised in the second treatment region.)

Upon exiting the second treatment region, the fiber may be further cooled at a different average cooling rate from the average cooling rate in the first or second treatment region. Cooling of the fiber upon exiting the second treatment region may further reduce the temperature of the fiber from the temperature of the fiber at the exit of the second treatment region to a temperature below 1200° C., preferably to a temperature below 1000° C., or a temperature below 800° C., or a temperature below 600° C., or a temperature below 400° C., or a temperature below 200° C., to a temperature of 50° C. or below.

Figure 2:
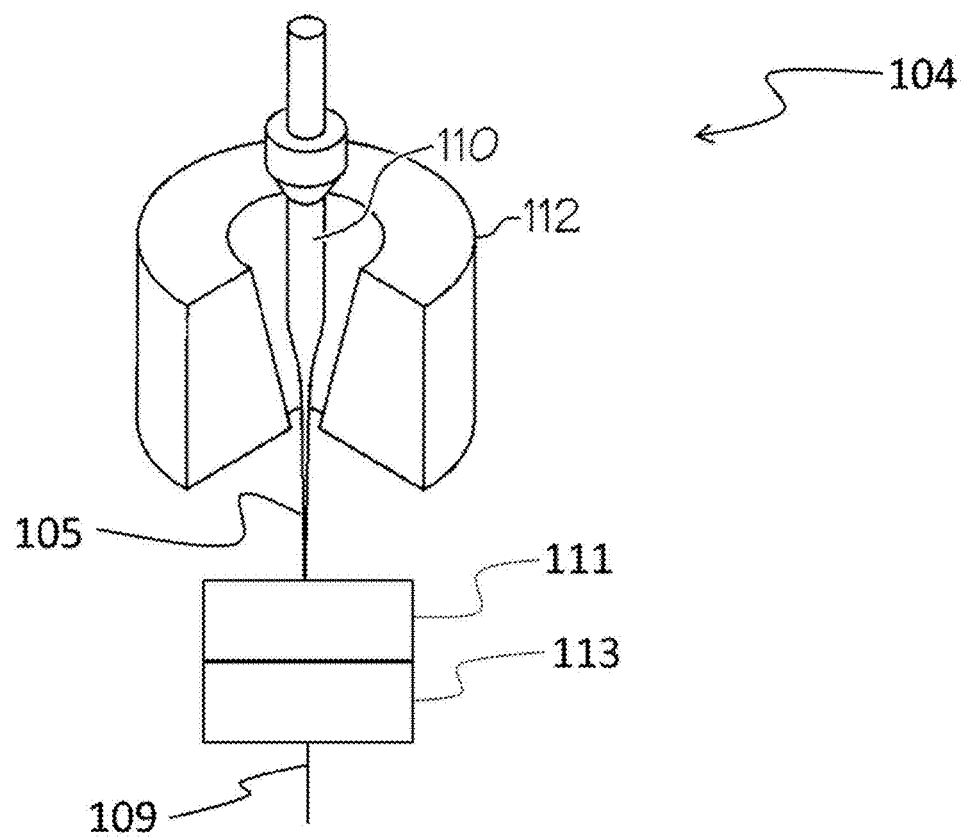
FIG. 2 depicts an optical fiber production system with a glass heating source and two adjacent treatment stages.

Systems for performing the present method are depicted schematically in FIGS. 1 and 2. Production system 104 includes a glass heating source with furnace 112 and optical fiber preform 110. Preform 110 is heated in furnace 112 to a temperature above its softening point and is drawn to form fiber 105, which is directed to first treatment region 111 (corresponding to the treatment stage 111', which is, in some embodiments for example is a furnace) with an entrance fiber temperature $T_1$ as described hereinabove and is cooled at a rate as described hereinabove to produce fiber 107 having an exit temperature $T_2$ from first treatment region 111 as described hereinabove. Fiber 107 enters second treatment region 113 (corresponding to the treatment stage 113', which is, for example a tubular furnace) with an entrance fiber temperature $T_3$ as described hereinabove and is cooled at a rate as described hereinabove to produce fiber 109 having an exit temperature $T_4$ from second treatment region 113 as described hereinabove. The positions of treatment regions 111 and 113 relative to each other and to furnace 112 (preform heating furnace), as well as the size or path length (L1, L2) of treatment regions 111 and 113 may be adjusted to conform to the entrance temperature, exit temperature, residence time, and/or cooling rates described hereinabove. FIG. 2 is a variation of FIG. 1 in which treatment regions 111 and 113 are directly adjacent to each other with no intervening space.

The fiber may pass through the first treatment region along a first pathway and cooling of the fiber in the first treatment region may occur along a first pathway. The first pathway may be linear. The fiber may pass through the second treatment region along a second pathway and cooling of the fiber in the second treatment region may occur along a second pathway. The second pathway may be linear. The second pathway may be collinear with the first pathway.

The fiber may be optionally cooled at a rate exceeding 15000 C/sec after exiting the second treatment region. The fiber may pass through the first treatment region and second treatment region along a first pathway and cooling of the fiber in the first and second treatment regions may occur along a first pathway. The fiber may pass along a second pathway after being cooled below 1100° C. after exiting the second treatment region. The second pathway may be linear. The second pathway may be collinear with the first pathway. Alternatively, the second pathway may not be collinear with the first pathway.

Treatment stages 111' or 113' corresponding to the treatment regions 111 or 113, in accordance with the present disclosure, may be, for example, furnaces or heated zones adjusted in temperature, size and environment that provide cooling rates and residence times in accordance with the present disclosure for a pre-selected fiber draw speed. However, the first treatment region 111 may not utilise a furnace, and the fiber may be cooled in air prior to entering the second treatment region 113 (for example a heated furnace or another enclosure capable of containing a heated gas or gas mixture within a chosen temperature range situated between 800° C. and 1500° C. The optical fiber may pass through the treatment regions 111, 113 without contacting a solid surface and may cool through radiative or conductive processes. The identity of the gas may be selected on the basis of thermal conductivity to influence the rate or efficiency of heat transfer from the fiber. The gas employed in first treatment region 111, for example, is selected to have a higher thermal conductivity than the gas employed in second treatment region 113 to further the objective described herein. The gas or mixture of gases employed in first treatment region 111, for example, may have an average thermal conductivity higher than or equal to, or less than, the average thermal conductivity of air over the operable temperature range of first treatment region 111. As described above, the gas or mixture of gases employed in second treatment region 113 preferably has an average thermal conductivity $\kappa_{ave}$ that is less than the average thermal conductivity of air over the operable temperature range of second treatment region 113.

At a faster fiber draw rates (>30 mm/sec) when the fiber is cooled from about 1700° C. to about 1200° C. in the treatment stage 113' (slower cooling stage), the reduced rate of cooling results in a lower fiber fictive temperature and lower fiber attenuation. We discovered that the required slowing of the fiber cooling, and/or the improvement in fiber attenuation can be achieved by properly selecting the gas or gas mixture environment employed in the second treatment region (treatment stage 113'), as described herein.

The cooling rate of optical fiber (dT/dL) between about 1700 and about 1200° C. at draw speeds of >30 m/sec (e.g., 30-80 m/sec) is dominated by the forced convection mechanism of heat transfer. Mathematically this is described by equation (1), below, and is a product of three parameters: (i) convective heat transfer coefficient h; (ii) heat content of the fiber, and (iii) the temperature difference between the fiber and the surrounding gas environment $$(dT/dL) = h\left(\frac{2}{V\rho C_{pf}r}\right)(T - T_\infty) \tag{1}$$

where T is fiber temperature, $T_\infty$ is the gas temperature, L is distance, h is the convective heat transfer coefficient, V is the draw speed of the fiber, p is fiber density, $C_{pf}$ is fiber heat capacity, and r is fiber radius (i.e., the outer radius of the uncoated fiber), The fiber cooling rate can reduced by reducing any one of these individual parameters (i) through (iii) described in the preceding paragraph. However, reducing the heat content of the fiber requires a reduction in draw speed which increases production cost. It is desirable to increase fiber draw speed, rather than to reduce it. Reducing the temperature difference may require increasing the temperature setpoint of the treatment stage 113' (e.g., furnace) to temperatures above the limit at which the lifetime of the resistive elements used to supply heat to the furnace is compromised. This lifetime reduction drives up equipment operation and maintenance costs. Thus, choosing a gas or a gas mixture with appropriate heat transfer coefficient is a best practical way to reduce the fiber cooling rate in the second treatment region 113.

At constant draw conditions, the gas properties of kinematic viscosity and more importantly thermal conductivity determine the heat transfer coefficient. For the second treatment region 113, these properties should be evaluated not at room temperature but at operating temperatures employed by second treatment region 113, or at a mean boundary layer temperature between the fiber temperature, T, and the temperature of the second treatment region 113, $T_\infty$. As an example, if the fiber temperature $T_4$ is 1200° C. (at the exit from the second treatment region) and the average operating temperature of the second treatment region 113 is 1100° C., the mean boundary layer temperature is about 1150° C. Therefore, in this exemplary embodiment the relevant temperature(s) for gas properties is about 1150° C. It is noted that the fiber temperature is the temperature of fiber's surface and can be measured by commercial devices, for example but an infrared pyrometer.

Figure 4:
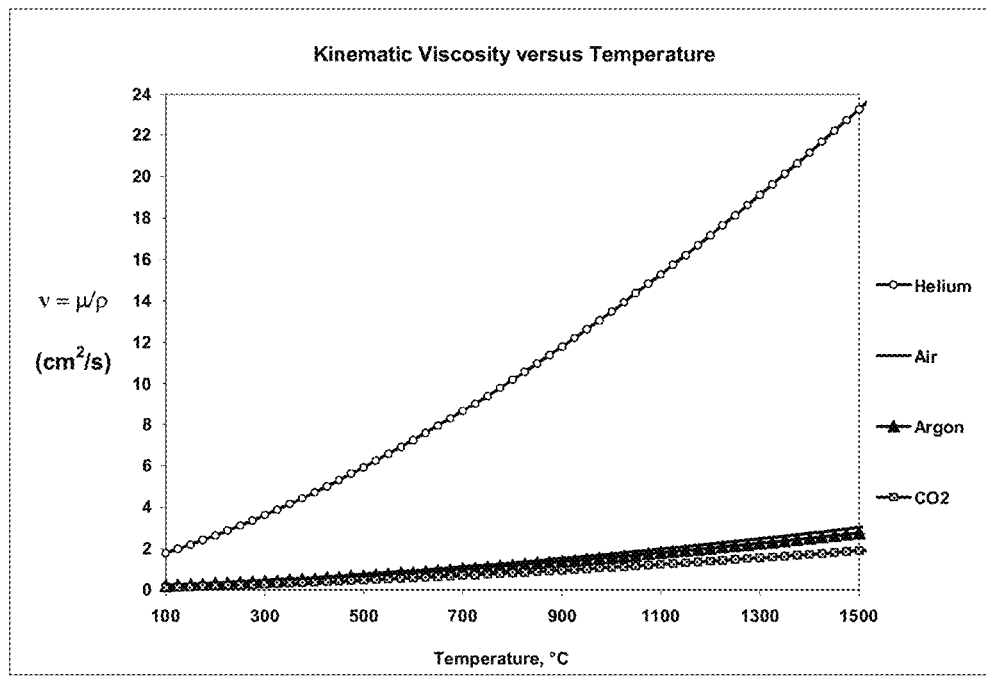
FIG. 4 depicts kinematic viscosity of several gases, vs. temperature.

As shown in FIG. 4, with the exception of Helium, the kinematic viscosities of different gases have only small differences across the temperature range employed in the second treatment region 113 (or at a mean boundary layer temperatures). That is, across the temperature range employed in the second treatment region 113 the kinematic viscosity of gasses (except for He) are close to that of air (FIG. 4) and thus are not a primary consideration for choosing a gas for slow fiber cooling in the second treatment region 113. We discovered that thermal conductivity over operating temperature employed by second treatment region 113 (or at the at a mean boundary layer temperature between the fiber temperature, T, and the temperature, $T_\infty$ of the second treatment region 113) is the primary determinant of the heat transfer coefficient for gases other than He.

Figure 5:
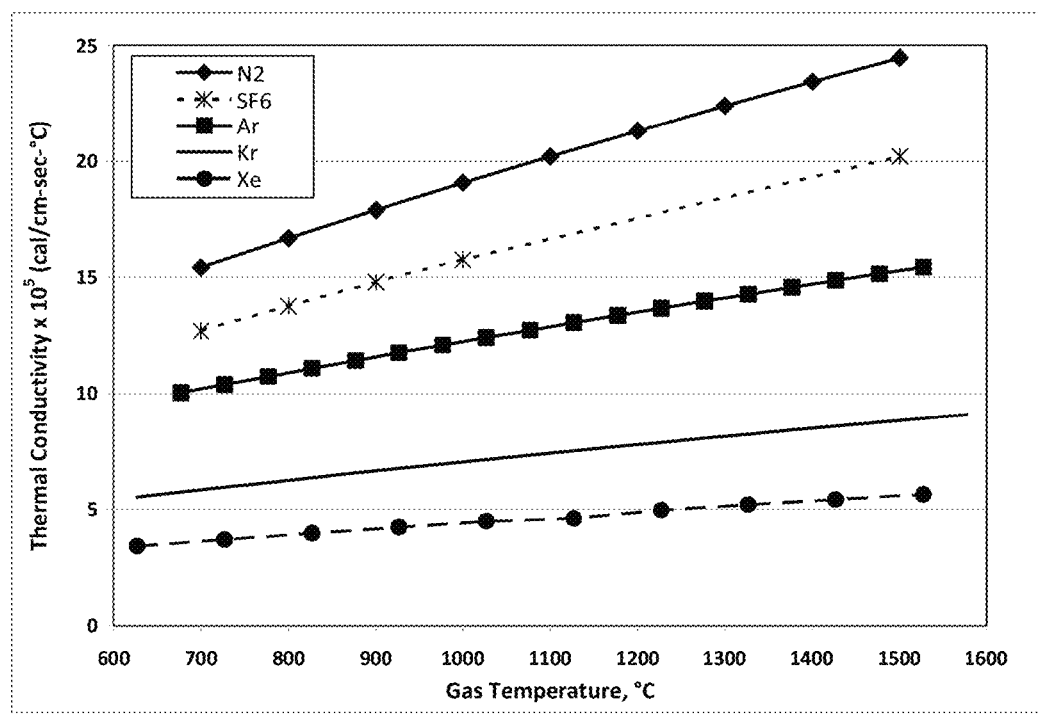
FIG. 5 depicts gas thermal conductivity κ (cal/cm s-K) of several gases vs. temperature (° C.) at atmospheric pressure.

FIG. 5 illustrates gas thermal conductivities $\kappa$ over a range of temperatures. The best gases for slow fiber cooling have the lowest thermal conductivities in the operating temperature range of the second treatment region 113 (e.g., for a temperature or temperatures) within a range of 800° C. to 1500° C. Preferably, in some embodiments, the operating temperature(s) in the second treatment region 113 is situated within 800° to 1300° C., for example in 1000° C. to 1300° C., to allow glass to relax at a fast enough rate while at the same time enabling the substantially large amount of relaxation to take place, which results in lower fiber attenuation. Preferably the operating temperature is 1000° C. to 1250° C. We discovered that at temperatures higher than 1500° C., average fictive glass temperature of the fiber becomes high, resulting in higher fiber attenuation. It is preferable that the operating temperatures of the second treatment region are 1300° C. or lower, because the resulting fibers have very low attenuation—e.g., ≤0.18 dB/km at 1550 nm and ≤0.32 dB/km at 1310 nm). In some embodiments the resulting fibers attenuation ≤0.31 dB/km at 1310 nm, or ≤0.30 dB/km at 1310 nm, or even ≤0.29 dB/km at 1310 nm (e.g., 0.28 to 0.29 dB/km at 1310 nm). The exemplary gases utilized in second treatment region 113) are the monatomic "noble gases" having average thermal conductivity less than $1.5 \times 10^{-4}$ cal/cm-s-K at temperatures between 800° C. and 1500° C. such as Argon, Krypton, Xenon, and Radon (at 1 atmosphere pressure, absolute). However, the pressure at in the second treatment region may be, for example, 0.25-1 atm, absolute. Another gas that can be candidate for use in the second treatment zone is $SF_6$. Thermal conductivity is inversely proportional to the cross sectional diameter of the gas molecule, and the square root of the molecule's mass, and is also proportional to the specific heat of the gas. Moreover, at a given temperature a low thermal conductivity gas has a small specific heat, large cross sectional diameter, and large mass. As monatomic molecules, the noble gases have constant specific heat values across all temperatures. In contrast, polyatomic gases such as Air, Carbon Dioxide, Carbon Tetrachloride, Chlorobenzene, and Sulfur Hexafluoride have specific heats that increase with temperature. The specific heats increase because polyatomic gases store energy as inter-atomic vibrations within the molecule. This increase in specific heat explains why the polyatomic thermal conductivities increase more than the monatomic gases with temperature. As shown in FIG. 5, the monatomic gases have thermal conductivities well below the polyatomic gases at operating temperatures utilized in second treatment region 113.

Figure 6:
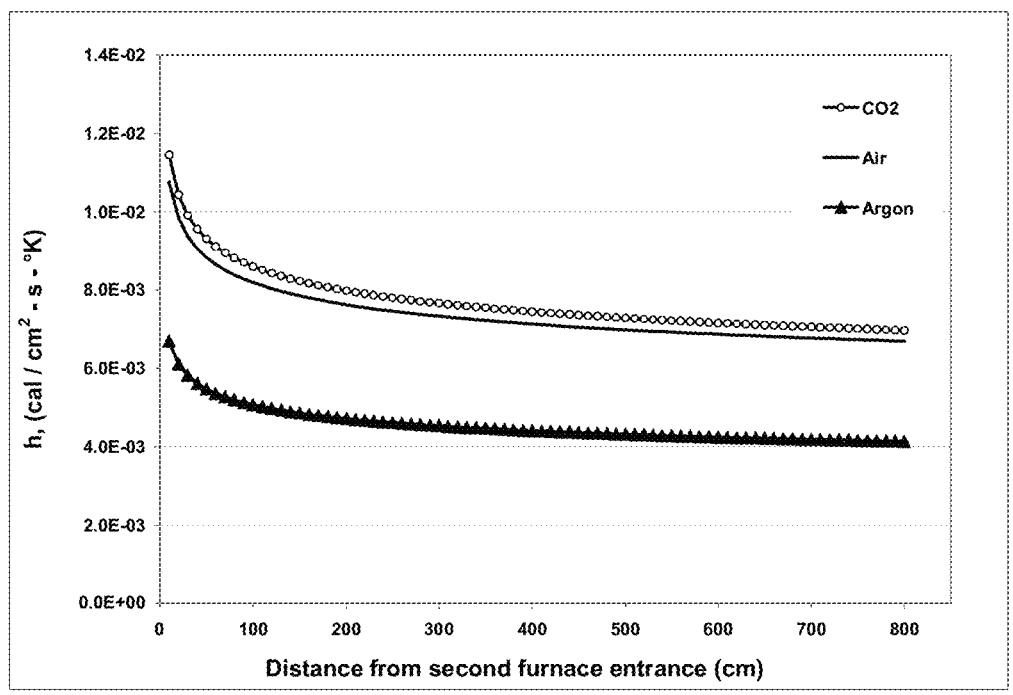
FIG. 6 depicts the calculated convective heat transfer coefficients h (cal/cm² s-K) for various gases at 1100° C. and 42 m/s fiber draw speed.
Figure 7A:
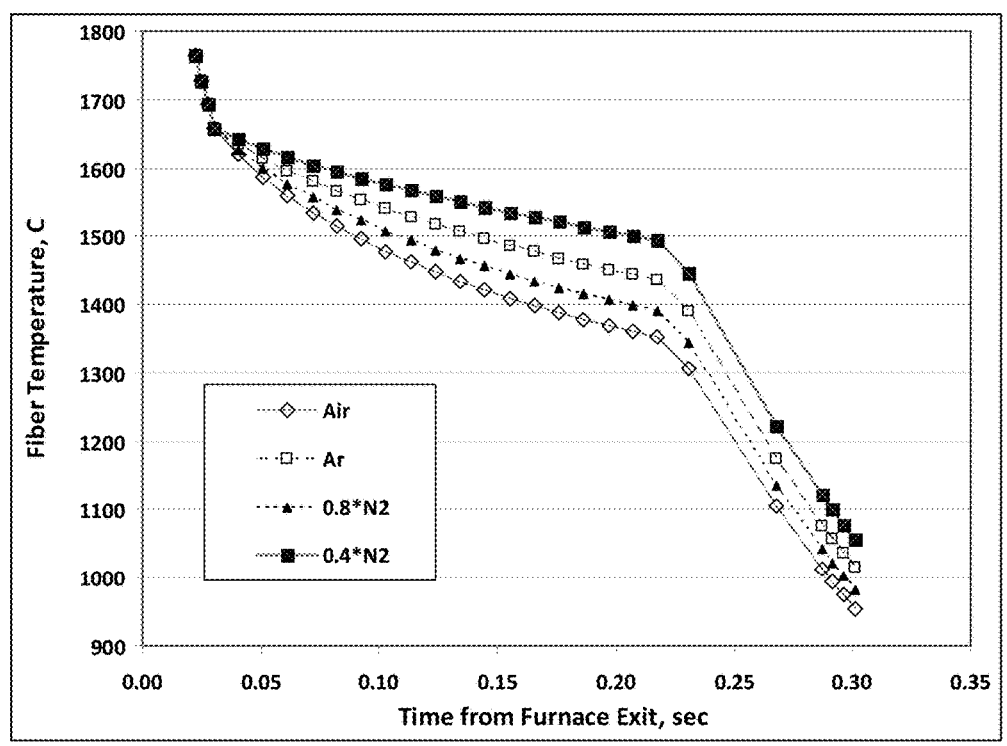
FIG. 7A depicts calculated fiber cooling profiles, as a function of time, from the exit aperture of the draw furnace.
Figure 7B:
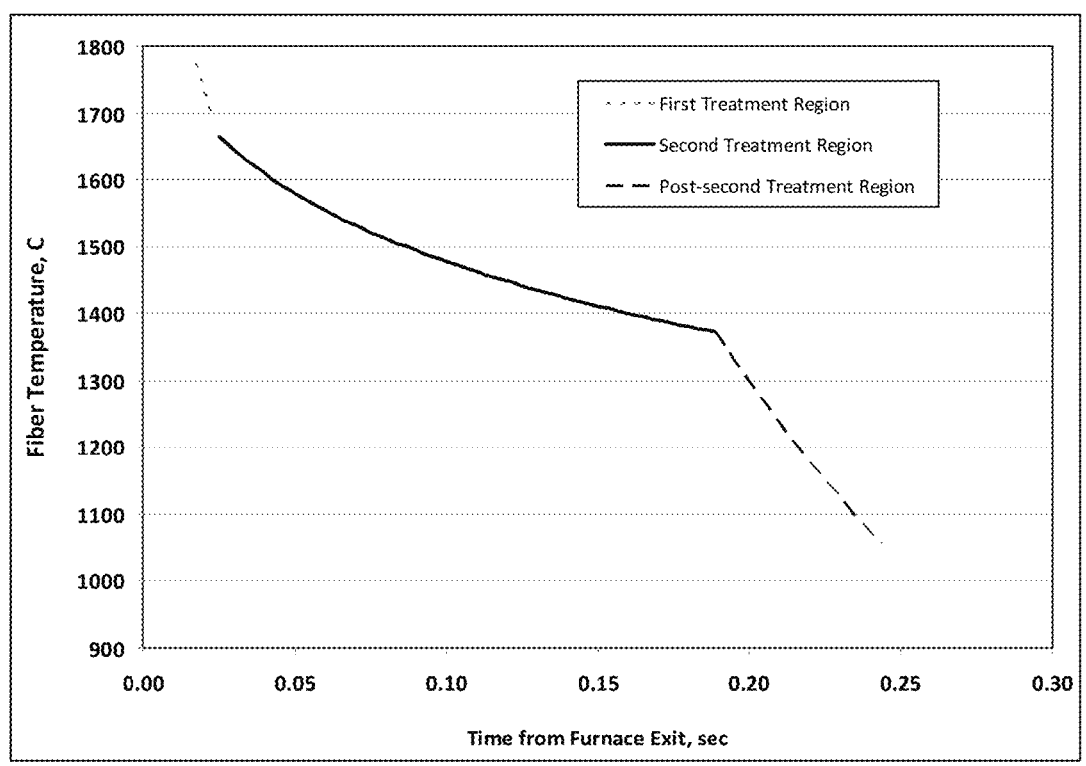
FIG. 7B illustrates an exemplary fiber temperature profile (° C.) as a function of time (sec).
Figure 7C:
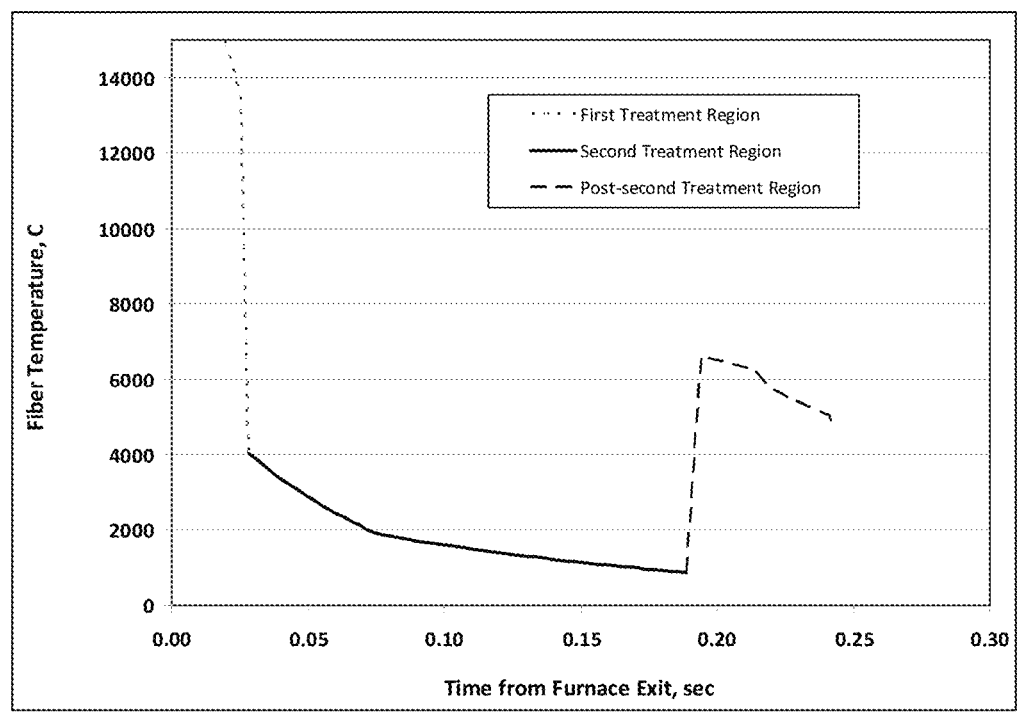
FIG. 7C corresponds to FIG. 7B and illustrates the exemplary fiber's cooling rate as a function of time (sec).
Figure 7D:
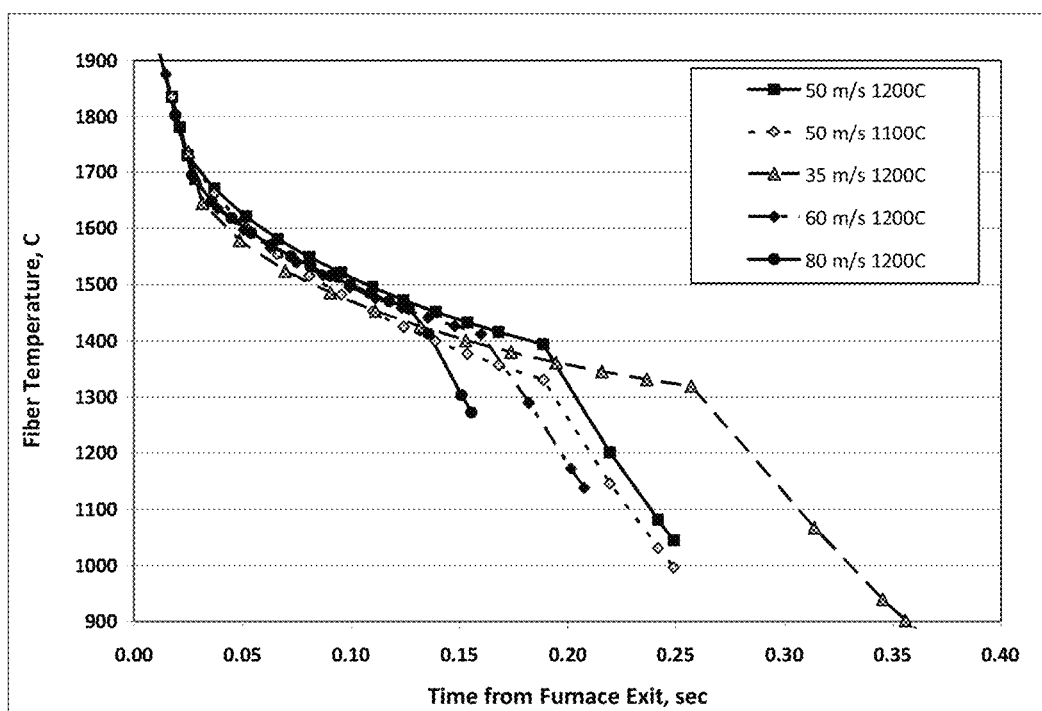
FIG. 7D illustrates several exemplary temperature profiles as function of time starting from fiber's exit from the draw furnace.
Figure 7E:
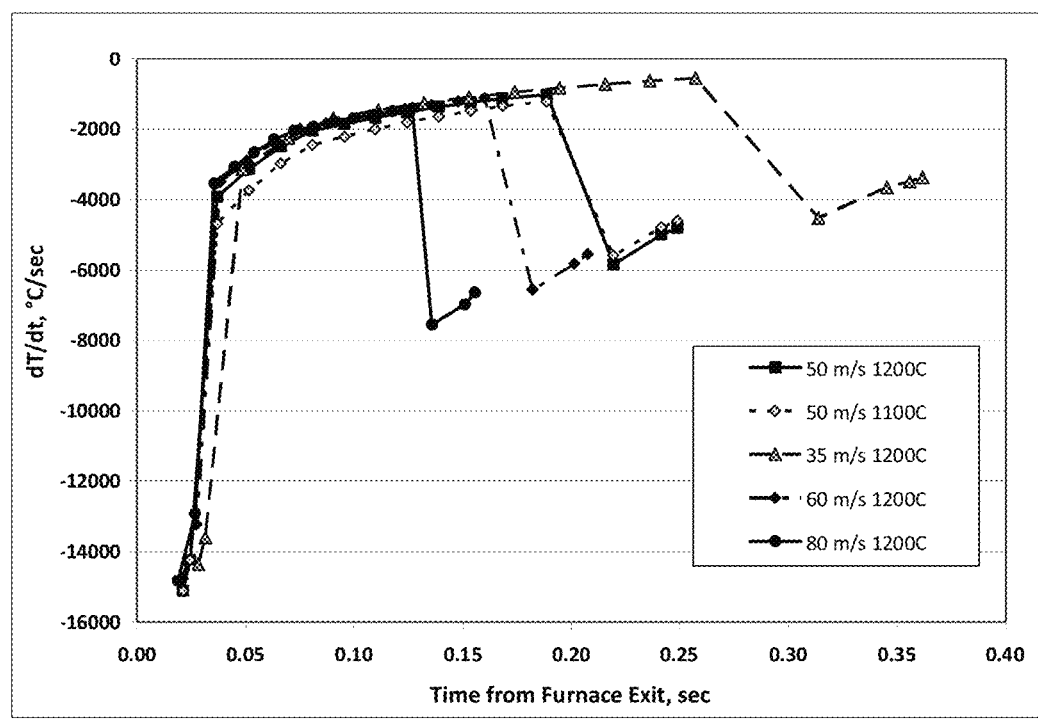
FIG. 7E corresponds to the fibers of FIG. 7D and illustrates exemplary fiber cooling rates (dT/dt) as a function of time from the exit aperture of the draw furnace.
Figure 8:
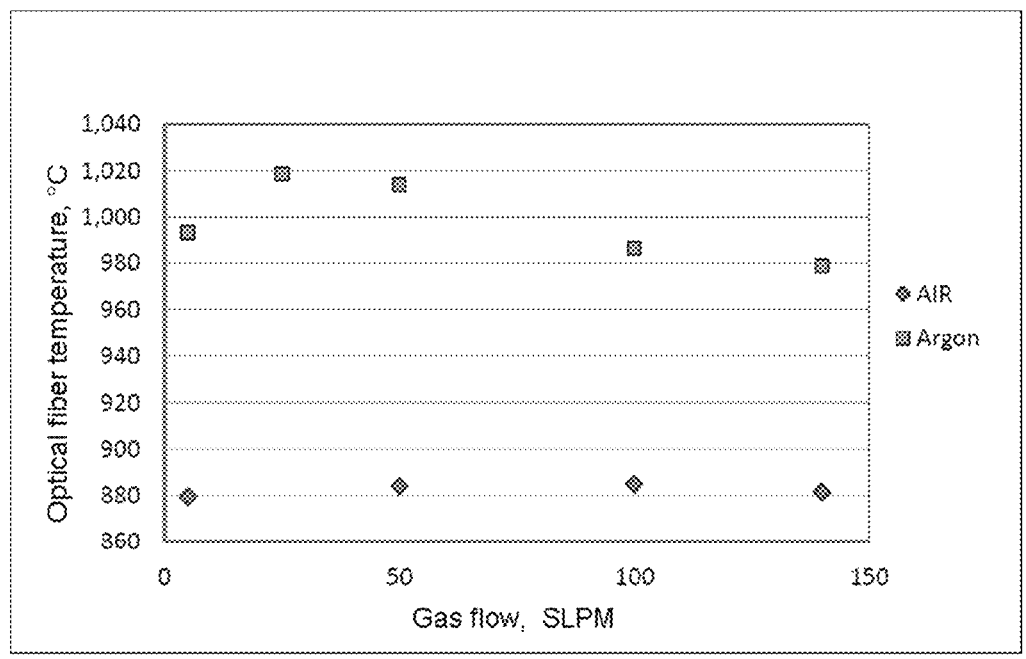
FIG. 8 depicts measured fiber temperatures after the exit from the second treatment stage for different gas flows (slpm). These data are for 42 m/s draw speed and a 1100° C. average operating temperature within the second treatment stage.

The impact of reducing gas thermal conductivity within the second treatment region 113 is shown in FIGS. 6-8. FIG. 6 shows about a 40% reduction in heat transfer coefficient at 42 m/s draw speed and 1100° C. temperature of the second treatment region 113. FIG. 8 shows a measured increase of about 100° C. in exit fiber temperature from the second treatment region 113 when the fiber cools in Ag instead of air. That is, fiber cooled slower when the second treatment region utilised Ag instead of air.

Figure 9:
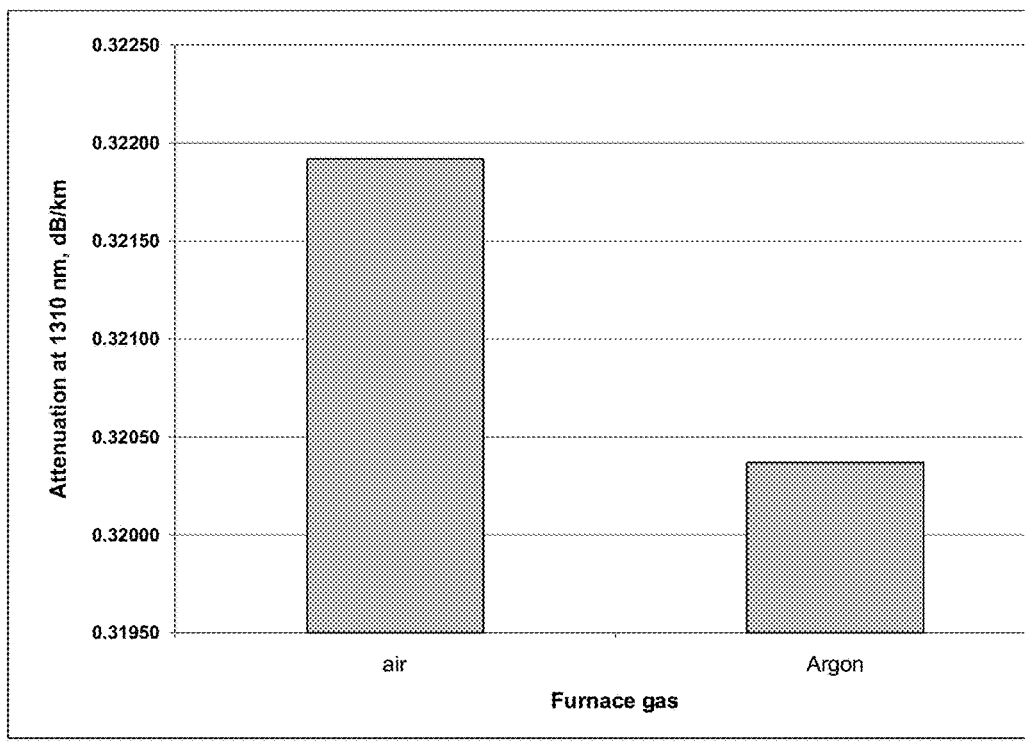
FIG. 9 illustrates the impact of utilizing Argon in the second treatment stages on fiber attenuation, measures at 1310 nm.

The benefit of applying a slower cooling rate in in second treatment region 113 is shown in FIG. 9. FIG. 9 depicts experimental data that shows a 1310 nm attenuation distribution for, the corresponding numerical data showed mean attenuation reduction on the order of 0.0016 dB/km for the fibers drawn at a 50 m/s draw speed when cooled in Ar instead of air. (For these fiber embodiments the operating temperature within the second treatment stage was 1165° C., and the median attenuation at 1310 nm for air cooled fibers was about 0.32192 dB/km, while for the fibers cooled in Ar the median attenuation was about 0.32037 dB/km). As shown in FIG. 9, this slow cooling in a gas thermal conductivity $\kappa_{ave}$ not greater than $1.6 \times 10^{-4}$ cal/cm-s-K with can greatly benefit the statistical distribution for manufacturing low loss fiber. In addition, this slower cooling capability can be leveraged to effectively increase draw speed and further lower manufacturing cost.

According to at the embodiments disclosed herein the gas or gas mixture surrounding the fiber during cooling in the second treatment region has average thermal conductivity $\kappa_{ave}$ not greater than $1.5 \times 10^{-4}$ cal/cm-s-K for temperatures within a temperature range of 800° C. to 1500° C. As discussed herein, the average thermal conductivity $\kappa_a$, over a given temperature range is defined as 0.5× (the maximum thermal conductivity over the given temperature range minus the minimum thermal conductivity over the same given temperature range). In some embodiments, the gas or gas mixture surrounding the fiber during cooling in the second treatment region has average thermal conductivity $\kappa_{ave}$ not greater than $1.3 \times 10^{-4}$ cal/cm-s-K, or not greater than $1.2 \times 10^{-4}$ cal/cm-s-K, or not greater than $1.0 \times 10^{-4}$ cal/cm-s-K, or not greater than $0.9 \times 10^{-4}$ cal/cm-s-K within a temperature range between 800° C. and 1500° C. In some embodiments, the gas or gas mixture surrounding the fiber during cooling in the second treatment region has average thermal conductivity $\kappa_{ave}$ that is between $0.3 \times 10^{-4}$ cal/cm-s-K and $1.4 \times 10^{-4}$ cal/cm-s-K at temperatures within the temperature range of 800° C. to 1500° C.

According to some embodiments, it is preferable that the gas or gas mixture surrounding the fiber during cooling in the second treatment region has, in the operable temperature range of the second treatment region, maximum thermal conductivity $\kappa$ that is not greater than $1.6 \times 10^{-4}$ cal/cm-s-K, for example: $2.5 \times 10^{-5}$ cal/cm-s-K≤$\kappa$≤$1.6 \times 10^{-4}$ cal/cm-s-K, or $0.5 \times 10^{-4}$ cal/cm-s-K ≤$\kappa$≤$1.6 \times 10^{-4}$ cal/cm-s-K, or $0.6 \times 10^{-4}$ cal/cm-s-K≤$\kappa$≤$1.6 \times 10^{-4}$ cal/cm-s-K. The gas or the gas mixture employed in the second treatment region should preferably be at a temperature between 800° C. and 1500° C., for example at a temperature below 1300° C. (e.g., 900° C. to 1300° C., or 1000° C. to 1300° C., or 1100° C. to 1275° C.). This provides the advantage of rapid relaxation of the glass at high draw rates (>30 m/sec, for example>40 m/sec) which results in lower fiber attenuation. According to some embodiments, it is preferable that the gas or gas mixture surrounding the fiber during cooling in the second treatment region has, in the operable temperature range of the second treatment region, the average thermal conductivity ($\kappa_{ave}$= (max thermal conductivity+min thermal conductivity)/2 in the operable temperature range of the second treatment region) that is not greater than $1.6 \times 10^{-4}$ cal/cm-s-K, for example:

$2.5 \times 10^{-5}$ cal/cm-s-K$\leq \kappa_{ave} \leq 1.5 \times 10^{-4}$ cal/cm-s-K, or $0.5 \times 10^{-4}$ cal/cm-s-K$\leq \kappa_{ave} \leq 1.5 \times 10^{-4}$ cal/cm-s-K, or $0.6 \times 10^{-4}$ cal/cm-s-K$\leq \kappa_{ave} \leq 1.5 \times 10^{-4}$ cal/cm-s-K.

According to some of the exemplary embodiments, the thermal conductivity κ, at 1 atm absolute, of gas or gas mixture surrounding the fiber during cooling in the second treatment region K for all temperatures within a range of 800° C. to 1500° C. is:

$0.25 \times 10^{-4}$ cal/cm-s-K$\leq \kappa a \leq 1.6 \times 10^{-4}$ cal/cm-s-K, or
$\leq \kappa a \leq 1.6 \times 10^{-4}$ cal/cm-s-K cal/cm-s-K.

According to some embodiments, the gas or gas mixture surrounding the fiber during cooling in the second treatment region has thermal conductivity κ not greater than $1.5 \times 10^{-4}$ cal/cm-s-K at the mean boundary layer temperature that is between 800° C. and 1500° C. or, between 900° C. and 1300° C., or between 1000° C. and 1250° C., for example about 1200° C. Thus, according to some exemplary embodiment, where the mean boundary layer temperature is about 1200° C., the gas or gas mixture surrounding the fiber during cooling in the second treatment region has a thermal conductivity κ, at 1200° C., between $0.5 \times 10^{-4}$ cal/cm-s-K and about $1.5 \times 10^{-4}$ cal/cm-s-K. Similarly, in an exemplary embodiment, where the mean boundary layer temperature is about 1100° C., the gas or gas mixture surrounding the fiber during cooling in the second treatment region preferably has a thermal conductivity κ, at 1100° C., between $0.5 \times 10^{-4}$ cal/cm-s-K and about $1.5 \times 10^{-4}$ cal/cm-s-K. As another example, in an embodiment where the mean boundary layer temperature is about 1000° C., the gas or gas mixture surrounding the fiber during cooling in the second treatment region preferably has a thermal conductivity κ, at 1000° C., of about $0.5 \times 10^{-4}$ cal/cm-s-K to about $1.5 \times 10^{-4}$ cal/cm-s-K.

According to some of the exemplary embodiments (where the mean boundary layer temperatures are in the 800-1500° C. range) the thermal conductivity κ of the gas or gas mixture surrounding the fiber during cooling in the second treatment region 113 is between about $0.5 \times 10^{-4}$ cal/cm-s-K and about $1.6 \times 10^{-4}$ cal/cm-s-K, for example between $0.5 \times 10^{-4}$ cal/cm-s-K and about $1.5 \times 10^{-4}$ cal/cm-s-K. (That is, according to these embodiments the gases or gas mixtures have the thermal conductivity value κ is $0.5 \times 10^{-4}$ cal/cm-s-K$\leq \kappa \leq 1.6 \times 10^{-4}$ cal/cm-s-K, or $0.5 \times 10^{-4}$ cal/cm-s-K$\leq \kappa \leq 1.5 \times 10^{-4}$ cal/cm-s-K at the mean boundary layer temperature situated within the temperature range of 800° C. to 1500° C.).

According to at least some embodiments, the method includes drawing a fiber at a rate of at least 30 msec (e.g., 40-80 msec) and cooling the fiber (in the second treatment region) at an average cooling rate less than 5000° C./s, where the cooling reduces the temperature of the fiber from an entering temperature in the range from 1500° C. to 1700° C. to another temperature in the range from 1200° C. to 1400° C., in a gas having an average thermal conductivity over the temperature range of 800° C. to 1500° C. of less than $1.5 \times 10^{-4}$ cal/cm-s-K. In some embodiments the gas has the average thermal conductivity over the temperature range of 800° C. to 1500° C. between $0.25 \times 10^{-4}$ cal/cm-s-K and $1.5 \times 10^{-4}$ cal/cm-s-K. According to some embodiments, the gas is Ar, Kr, Xe, and/or Rn, or a mixture thereof. According to some embodiments, the fiber drawing rate is 30 msec to 80 msec. According to some embodiments, the fiber cooling in the gas reduces the temperature of the fiber by at least 100° C. According to at least some embodiments, the fiber cooling in the gas reduces the temperature of the fiber by at least 200° C. According to some embodiments the temperature of gas during cooling of the fiber is between 800° C. and 1500° C. (e.g., 800° C.-1300° C., or 900° C.-1250° C., or 1000° C.-1250° C., or 1100° C. to 1250° C.). In some embodiments, the temperature of gas or gas mixture during cooling of the fiber in the second treatment region is between 1000° C. and 1300° C.

It is preferable that cooling the fiber at an average cooling rate less than 5000° C./s occurs in the second cooling region. In these embodiments the fiber's temperature upon entering into the second cooling region (entering temperature $T_3$) is in the range from 1500° C. to 1700° C., and the cooling in the second cooling region reduces the temperature of the fiber from the entering temperature $T_3$ to another temperature $T_4$, where 1200° C.$\leq T_4 \leq$1400° C., in a gas having the average thermal conductivity $\kappa_{ave}$ over the temperature range of 800° C. to 1500° C. of less than $1.5 \times 10^{-4}$ cal/cm-s-K. In some embodiments the gas has the average thermal conductivity $\kappa_{ave}$ over the temperature range of 800° C. to 1500° C. between $0.25 \times 10^{-4}$ cal/cm-s-K and $1.5 \times 10^{-4}$ cal/cm-s-K and is at the temperature(s) between 800° C. and 1500° C.

FIG. 5 shows the dependence of gas Thermal Conductivities (k) on temperature for several gasses at atmospheric pressure.

FIG. 6 shows the calculated convective heat transfer coefficients h for various gases at 1100° C. (exemplary operating temperature of the second treatment region 113), and 42 m/s fiber draw speed. The values h are plotted versus the distance from the entrance into the second treatment region 113 (i.e., the distance (in cm) inside the second treatment region from the entrance into the treatment stage 113' (also referred to herein as a slow cooling device (SCD)), which in FIG. 6 embodiment is referred to for example, as a Furnace 2). The second treatment region 113 thus is provided by the treatment stage 113', which can be, for example, a furnace with Nichrome-based heating elements (with preferable operating temperature range of 1275° C. or below, or a holding ovens or furnace that has Molybdenum disilicide heating elements (and operates, for example at temperatures >1300° C.).

In this exemplary embodiment the length L2 of second treatment region 113 is 800 cm. Note that the h values for Argon are significantly lower than those for Air and Carbon Dioxide. It is noted that the exemplary average operating temperatures (gas temperature(s)) of the second treatment region 113 may be 900° C. to 1500° C. (e.g., 1000° C. to 1400° C., or 1100° C. to 1300° C., or 1100° C. to 1250° C.). According to at least some embodiments the thermal conductivity h of the gas or the gas mixture in the center (i.e., mid length) of the second treatment region 113 at the operating temperature(s) of the second treatment region 113 is less than $6.5 \times 10^{-3}$ cal/cm$^2$-s-K, for example less than $6.0 \times 10^{-3}$ cal/cm$^2$-s-K, or less than $5.0 \times 10^{-3}$ cal/cm$^2$-s-K. According to at least some embodiments the thermal conductivity h of the gas or the gas mixture in the center of the second treatment region 113 (i.e., mid length) at the operating temperature(s) of the second treatment region 113 is between $3.0 \times 10^{-3}$ cal/cm$^2$-s-K and $6.5 \times 10^{-3}$ cal/cm$^2$-s-K, or between $3.0 \times 10^{-3}$ cal/cm$^2$-s-K and $6.0 \times 10^{-3}$ cal/cm$^2$-s-K, or between $3.0 \times 10^{-3}$ cal/cm$^2$ s-K and $5.0 \times 10^{-3}$ cal/cm$^2$-s-K.

FIG. 7A shows calculated fiber cooling profiles (fiber temperature versus time) within the second treatment region 113 (within the treatment stage 113') from the exit aperture of the draw furnace. It is noted that a first portion of the graph (time 0 to about 0.3 sec corresponds to the fiber temperature in first treatment region, the second portion of the graph (time from about 0.3 sec to about 0.213 sec) corresponds to the fiber temperature in the second treatment region, and the third section of the graph (time >0.23 sec) corresponds to the fiber temperature after it exited the second treatment region. In this embodiment the operating temperature within the second treatment region 113 was 1100° C., and the fiber draw rate was 42 msec. Note that the calculations predict slower cooling rates in an Argon environment compared to Air (laminar flow). When argon (Ar) is utilised, as shown in FIG. 7A, in this embodiment the average cooling rate in the slow cooling region (i.e., in the second treatment region) is approximately 1800° C./sec. According to some embodiments the fiber average cooling rates in the second treatment region 113 may be 1450° C./sec-2500° C./sec, for example: 1450° C./sec-2300° C./sec, or 1625° C./sec to 2500° C./sec. For example, for Ar cooling embodiments similar to that shown in FIG. 7A (when Ar is utilized in the second treatment region 113), for fibers drawn at 42 msec and at initial (entering) temperatures of 1670° C. into the second treatment region 113, and residence time of 0.1095 sec within the second treatment region 113, the average rates of cooling ($\Delta T/\Delta t$) are about 1474° C./sec. This is summarised in Table 1, below, which compares calculated fiber cooling rates under similar conditions when the second treatment region 113 utilises Ar, vs. a comparative example when air is used instead.

TABLE 1

| | Fiber entrance temperature (° C.) | Fiber exit temperature (° C.) | Residence time in the second treatment region 113 (sec) | Cooling rate $\Delta T/\Delta t$ (° C./sec) |
| --- | --- | --- | --- | --- |
| Comparative example, Air | 1670 | 1290 | 0.1905 | 2000 |
| Argon | 1670 | 1390 | 0.1905 | 1474 |

The draw speed of the fibers of Table 1 is 42 m/sec.

FIG. 7A also illustrates calculated cooling profiles for fibers with thermal conductivity κ of a gas in the second treatment region that is 0.8 and 0.4 times that of the thermal conductivity of air, at the temperatures between 800° C. and 1500° C. As can be seen from FIG. 7A, reducing the thermal conductivity of the gas by 20% and 60% relative to the corresponding thermal conductivity of air results in significant reduction in the cooling rate in the fiber temperature range of interest where glass relaxation occurs FIG. 7B illustrates the fiber temperature profile as a function of time elapsed from the furnace exit for the embodiment (d): draw speed of 50 m/s, the temperature of second treatment region=1200° C. and the location of the second treatment region is 126 cm downstream of the draw furnace (from furnace's exit aperture). The optical fiber is calculated to enter the second treatment region 113 at a temperature of about 1680 C and exit the second treatment region at a temperature of 1380° C. The corresponding cooling rates for these conditions are shown in FIG. 7C. The cooling rate in the second treatment region is between 1000° C./sec and 4000° C./sec FIG. 7D is similar to FIG. 7B, but illustrates temperature profiles as function of time (elapsed from furnace exit) for several exemplary fibers drawn at different draw speeds (35 m/sec to 80 m/sec). The entrance to f the second treatment region is again 126 cm downstream from the draw furnace exit aperture. The modeled operating temperatures in second treatment region were 1100° C. and 1200, as indicated in the figure. FIG. 7D illustrates that in these exemplary embodiments, when the fibers were cooled in Ar, the fiber temperatures were about 1600° C. to about 1750° C. (entrance temperatures $T_3$), and between about 1300° C. and 1400° C. (exiting temperatures $T_4$); and that in these embodiments the fiber temperatures in the middle portion of the second treatment region were between about 1400° C. and 1550° C.

FIG. 7E corresponds to the fibers of FIG. 7D and illustrates fiber cooling rates (dT/dt) within the second treatment region 113, which in FIG. 7D are depicted by the flatter portion of the curves. (Cooling is indicated by negative dT/dt values). More specifically, for fiber embodiments of FIG. 7D absolute dT/dt ranges are below 4000° C./sec (i.e. 3000° C./sec-4000° C./sec) for the fibers just entering the second treatment region and between 500° C./sec and 2000° C./sec in the middle of the second treatment region. FIG. 7E further indicated that in these embodiments, the fibers cool at a faster rate upon exiting the second treatment region. The operating temperature of the second treatment region (slow cooling region) in the exemplary embodiments of FIG. 7E is 1200° C. (i.e., the gas temperature was 1200° C.), and the fiber draw speeds were 35 m/sec to 80 m/sec).

FIG. 8 illustrates measured fiber temperatures after the fiber exit from the second treatment region 113 (i.e., at the exit aperture of the treatment stage 113') for different gas flows within the treatment stage 113'. These data are for 42 m/s draw speed and a 1100° C. operating temperature within the treatment region 113, and the plot shows data for Argon and for a comparative example (air). Note that the fiber temperature data for the Argon gas environment indicated that the fiber drawn at the same draw speed through the same treatment stage 113' is about 100° C. hotter than for the fiber subjected to the air environment, which agrees with the calculated data shown in FIG. 7.

FIG. 9 shows the impact of introducing Argon into the second treatment region 113 (corresponding to the furnace or stage 113') on 1310 nm attenuation of exemplary fiber. More specifically, the data are from one SMF (single mode fiber) run at 50 m/s draw rate with the operating second treatment stage 113' temperature of 1165° C., a ¾" entrance aperture (nozzle aperture diameter), and with the entrance to the second treatment zone 182 cm below the exit of the furnace. The left side of the graph corresponds to the fiber cooled in air, the right side of the graph depicts attenuations for fibers cooled in an Argon environment (both were cooled in the furnace stage 113' which was held at the same temperature). All fiber data are for spool lengths greater than 19 km with no point defects produced under draw "tractor speed qualified" conditions. We found that the FIG. 9 optical fibers embodiments cooled in Argon within the second treatment region 113 exhibit about 0.0012 dB/km reduction in 1310 nm attenuation compared to the control fibers cooled in an Air under otherwise similar conditions.

As described above, the average gas or gas mixture temperature employed in first treatment region 111 is preferably lower than the average gas temperature employed in second treatment region 113. The closer the temperature of the treatment region is to the temperature of the fiber, the slower is the cooling rate. For example, the first treatment region 111 may include a furnace 111' with a treatment zone having an operable temperature between 200° C. and 500° C., while second treatment region 113 may include a furnace 113' with a treatment zone having an average operating temperature between 800° C. to 1500° C., but preferably 900° C. to 1300° C., for example 1000° C.-1300° C.

Processing in the second treatment region 113 includes passing the fiber through a gas ambient at a draw speed greater than 30 m/sec, for example 30-80 m/sec (e.g., 40 m/sec, 50 m/sec, 60 m/sec, 70 m/sec, 80 m/sec, or therebetween). Second treatment region 13 may include, for example, a furnace with a heated zone having a temperature between 800° C. and 1500° C., more preferably 800° C. and 1300° C. The gas ambient includes, or may consist essentially of, a gas having a thermal conductivity less than $1.5 \times 10^{-4}$ cal/cm-s-K at the operating temperature of second treatment region 113, for example less than $1.25 \times 10^{-4}$ cal/cm-s-K, or even less than $1.0 \times 10^{-4}$ cal/cm-s-K (e.g., $0.5 \times 10^{-4}$ cal/cm-s-K to $1.5 \times 10^{-4}$ cal/cm-s-K at the operating temperature of second treatment region 113). The temperature of the gas ambient may be varied to influence the rate of cooling in the second treatment region to achieve a rate of cooling in accordance with the present disclosure. The residence time of the fiber in second treatment region 113 may be adjusted to provide an exit temperature in the range from 1200-1400° C., or other range described hereinabove.

The present method may further include redirecting the optical fiber after exiting the second treatment region. The redirection may include diverting the fiber from one processing pathway to another processing pathway. Drawing of the fiber from the heated glass source (e.g. an optical fiber preform in a draw furnace) may occur in a vertical downward direction and the fiber may be directed through the first treatment region and second treatment region in a substantially vertical direction. Redirection of the fiber upon exit of the second treatment region may enable further cooling or processing in a non-vertical direction, such as a horizontal direction. Redirection of the fiber upon exit of the second treatment region may involve changing the direction of the fiber along its fiber path multiple times. Redirection of the fiber is advantageous because it increases the effective processing path length without the need to increase the vertical space of the production facility. The direction of the fiber may also be changed from substantially horizontal to substantially vertical.

Redirection of the fiber may be accomplished by one or more redirection devices. Redirection devices include fluid bearing devices and air-turn devices. Fluid bearing devices and air-turn devices preserve the integrity of the fiber by accomplishing redirection of the fiber without making physical contact with the fiber. Instead, redirection is achieved with the force of a pressurized fluid. The fiber passes through a support channel contained within the fluid bearing or air-turn device. The fluid bearing or air-turn device may be circular and the fiber support channel may be formed along or within the circumference of the device. Pressurized fluid supplied from a groove or orifice at the bottom of the fiber support channel provides a force that repels the fiber from the surface of the channel to prevent physical contact. As the fluid or air passes around the fiber and exits the fiber support channel, it creates a pressure distribution that operates to retain the fiber in the center of the support channel via the Bernoulli effect according to principles known in the art. As a result, the fiber conforms to the fiber support channel and is guided in an arcuate direction defined by the fiber support channel to achieve redirection. The direction of the fiber may be changed from substantially vertical to substantially horizontal. The direction of the fiber may be changed by an angle less than 90°, or an angle of 90°, or an angle between 90° and 180°, or an angle of 180°. Illustrative redirection devices are described in U.S. Pat. Nos. 7,737,971 and 8,074,474, and U.S. Patent Application Publication No. 2009/0158779; the disclosures of which are hereby incorporated by reference herein.

When implementing fiber redirection in the present method, the two treatment regions described hereinabove may be placed upstream of a redirection device or upstream of the first of a series of redirection devices. Upstream placement of the treatment regions permits cooling of the fiber in the controlled temperature ranges and at the controlled cooling rates described hereinabove.

Figure 3:
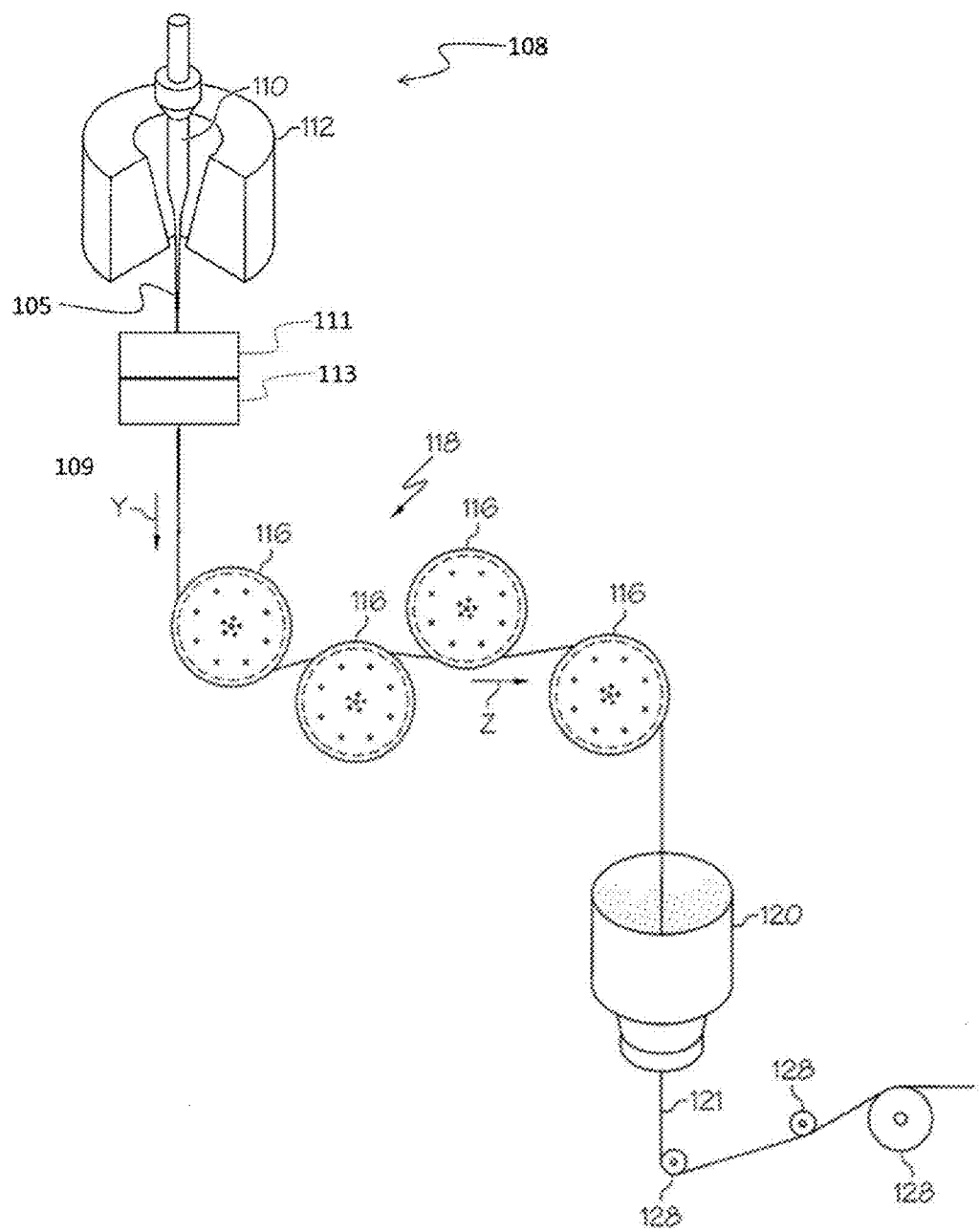
FIG. 3 depicts an optical fiber production system with a glass heating source, two treatment stages, several fiber redirection devices, a coating apparatus and a drawing mechanism.

An apparatus for accomplishing redirection of the fiber is depicted schematically in FIG. 3. Optical fiber production system 108 includes furnace 112 for heating optical fiber preform 110 to a temperature above its softening point and is drawn to form fiber 105, which is directed to first treatment region 111 and second treatment region 113 to form fiber 109 as described hereinabove in connection with FIG. 1. First treatment region 111 and second treatment region 113 is configured to reduce the temperature of the fiber in accordance with the ranges described hereinabove. The pathway of the fiber through first treatment region 111 is linear and the pathway of the fiber through second treatment region 113 is linear. The linear pathway of the fiber through first treatment region 111 is collinear with the linear pathway of the fiber through second treatment region 113. Fiber 109 is further directed through series 118 of redirection devices 116 and is redirected from a vertical pathway to a more nearly horizontal pathway and back to a more nearly vertical pathway for delivery of the fiber to coating unit 120 to form coated fiber 121. The force to pull the fiber is provided by drawing mechanism 128, which may also be present in the production systems of FIG. 1 and FIG. 2. Redirection devices 116 may be fluid bearing devices or air-turn devices. The manufactured fiber is cut to required length(s) to separate it from the fiber that is still being drawn, forming fiber optical fiber 10.

EXAMPLES

Several optical fibers were manufactured utilizing the above described method, and evaluated. The fiber fictive temperature is reduced and the optical fiber has improved attenuation.

The glass optical fiber 10 of the embodiment disclosed herein includes silica based core 1 doped with a Ge, Cl and/or K and surrounded by a silica ($SiO_2$) based cladding 12. For example, the core may be Ge doped silica, Cl doped silica, or may include both Ge and Cl. The cladding 12 may or may not include Fl, and may include Cl. According to some embodiments the fiber has an average fictive temperature of less than 1475° C.

The fiber may be coated, the coated fiber including a polymer based coating 13 (not shown) surrounding the cladding that may comprise of the primary and secondary coating layers.

According to some embodiments the optical fiber 10 may include:
(i) a silica based glass core 1 containing $GeO_2$, Cl, $K_2O$ or a mixture thereof, the core having a relative refractive difference with respect to silica of 0.1% to 0.45%, the core 1 having a residual stress that is a tensile stress with a value between 0 MPa to 15 MPa (e.g., 0.1 MPa to 15 MPa, or 1 MPa to 15 MPa in at least one region of the core); and
(ii) a silica based glass cladding 12 surrounding the core; and (iii) at least one polymeric coating 13 surrounding the cladding.

According to some embodiments at least one portion of the fiber cladding has a residual stress that is a tensile stress with a value of 5 MPa to 40 MPa, preferably below 35 MPa, and more preferably with a value of 5 MPa to 30 MPa, for example 5 MPa-25 MPa, or 5 MPa to 20 MPa to further improve fiber attenuation.

According to some embodiments the optical fiber 10 includes:
(i) a silica based glass core 1 containing $GeO_2$, the core having a relative refractive difference with respect to silica of 0.25% to 0.45%, the core 1 having a residual stress that is a tensile stress with a value between 0 MPa and 15 MPa; and
(ii) a silica based glass cladding 12 surrounding the core 1; and
(iii) a polymeric coating 13 surrounding the cladding 12.

In some embodiments the cladding 12 includes a silica based inner cladding portion (for example a depressed refractive index portion 2, surrounded by the outer cladding portion. The inner cladding portion may be for example, silica doped with Fl.

Figure 10A:
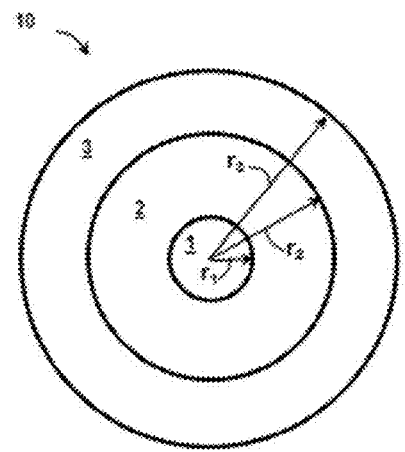
FIG. 10A illustrates schematically a cross-section of for some of the exemplary fiber embodiments described herein.
Figure 10B:
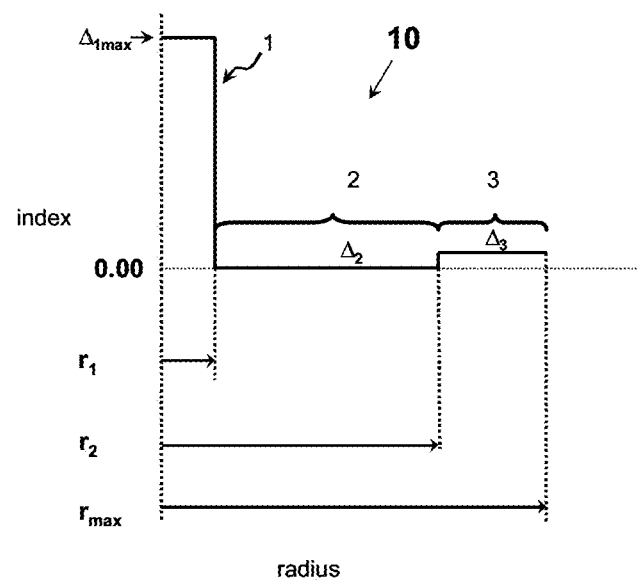
FIGS. 10B-E illustrate schematically several refractive index profiles for the exemplary optical fiber(s) embodiments described herein.
Figure 10C:
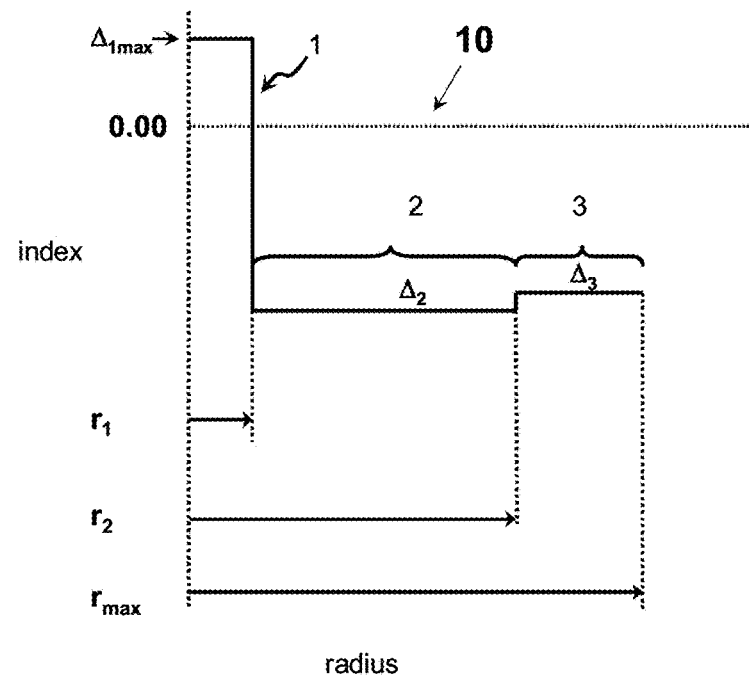
Figure 10D:
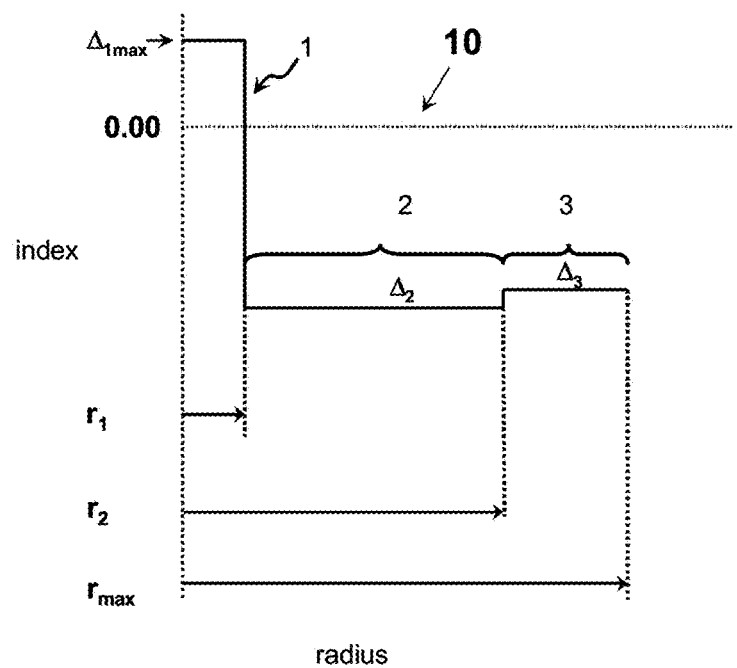
Figure 10E:
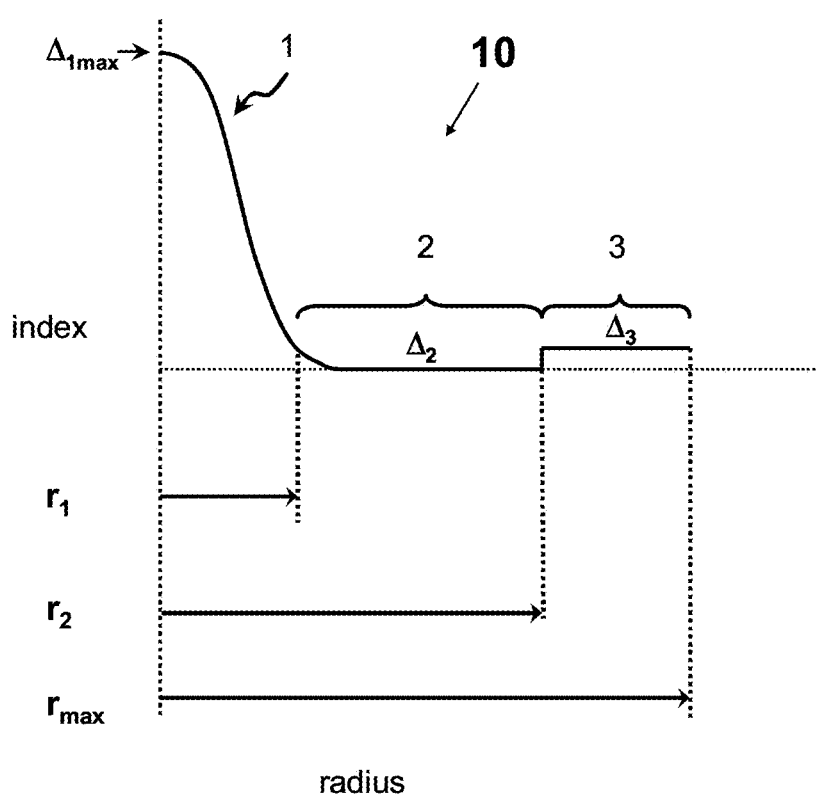

FIG. 10A illustrates schematically a cross-section of for some of an exemplary optical fiber 10. As shown in FIG. 10A embodiment, the fiber 10 includes core 1 with an outer radius $r_1$, and cladding 12 that includes an annular cladding portion 2 having an outer radius $r_2$ and outer cladding portion 3 with an outer radius $r_3$ surrounding cladding portion 2. FIGS. 10B-E illustrate schematically several refractive index profiles for four exemplary optical fiber embodiments that correspond to FIG. 10A. As shown in FIGS. 10B-10E, the core has a maximum relative refractive index $\Delta_{1max}$ (relative to pure silica), the annular cladding portion 2 has a relative refractive index $\Delta_2$ (relative to pure silica) and the outer cladding portion had a relative refractive index $\Delta_2$ (relative to pure silica). In the embodiments shown in FIGS. 10B-10E, $\Delta_{1max}>\Delta_2$ and $\Delta_2<\Delta_3$, and the annular cladding portion 2 (the depressed index portion of the cladding, or a moat) has a residual stress that is a tensile stress with a value of 5 MPa to 40 MPa, preferably below 35 MPA, and more preferably with a value between 5 MPa and 30 MPa to further improve fiber attenuation.

For example, the fiber 10 may have a core that is held under tensile stress with a value between 0 MPa and 15 MPa, and the inner cladding 2 may have tensile stress with a value between 5 MPa and 40 MPa, or between 10 MPa and 40 MPa. In some embodiments the inner cladding 2 may have tensile stress of 5 MPa to 35 MPa, or 10 MPa to 35 MPa, or between 5 MPa and 25 MPa, between 5 MPa and 20 MPa.

For example, according to some exemplary embodiments the fibers core's tensile stress may be between 0 MPa and 13 MPa, or 0 MPa to 10 MPa, or 0 MPa to 7 MPa, or 0 to 5 MPA. In at least some embodiments the core is in tensile stress between about 0.1 MPa and about 13 MPA in at least in an outer (radial) half portion of the core, which encompasses most of the core's area In at least some embodiments the fiber's inner cladding portion (annular cladding portion 2) has a maximum residual stress that is a tensile stress with a value between less than or equal to 35 MPa (e.g., between 5 MPa and 30 MPa, or between 5 MPa and 25 MPa, or between 10 MPa and 20 MPa. We discovered that when the inner cladding portion is in tensile stress between 5-20 MPa the fiber attenuation is further improved.

The fictive temperature of silica fibers prepared in accordance with the present description may be less than 1450° C., or less than 1400° C., or less than 1350° C., or less than 1300° C., or less than 1250° C., or less than 1200° C., or less than 1150° C., or less than 1100° C.

The fictive temperature is the temperature the glass structure is in equilibrium with. It can be measured via IR (infra-red) beam measuring methods, using for example the method described in D. L. Kim and M. Tomozawa, "Fictive Temperature of Silica Glass Fiber. As used herein, fictive temperature for the optical fiber is the bulk fictive temperature across the fiber radial cross-section (because the fiber's cross-section is small, taking one measurement in the cross-section of the glass fiber is sufficient).

The attenuation of silica fibers 10 prepared in accordance with the present description at 1550 nm may be less than 0.18 dB/km, or less than 0.17 dB/km, or less than 0.16 dB/km, or less than 0.15 dB/km, or less than 0.14 dB/km, or less than 0.13 dB/km, or less than 0.12 dB/km. It is noted that the fictive temperature of the fiber decreases as the cooling rate of the fiber going through the second treatment region increases, and fiber attenuation decreases as the fictive temperature of the fiber is decreased. This is because the slower cooling facilitates more complete structural relaxation of the fiber and leads to production of fibers with lower fictive temperature, According to some embodiments the optical fiber 10 has a mode field diameter (MFD) of 8.2 microns <MFD<9.5 microns at a wavelength of 1310 nm; a 22 meter cable cutoff is <1260 nm; and attenuation <0.183 dB/km at 1550 nm. According to at least some embodiments the optical fiber comprising glass core containing $GeO_2$ surrounded by silica based cladding and fiber has a fictive temperature less than 1450° C. and an attenuation at 1550 nm of less than 0.18 dB/km. According to some embodiments the fictive temperature of the fiber is less than 1300° C., or even less than 1200° C. For example, according to some embodiments the fictive temperature of the fiber may be 900° C. to 1400° C. or be 900° C. to 1300° C. °, or be 900° C. to 1250° C. In one embodiment, the fiber has a fictive temperature less than 1250° C. and an attenuation at 1550 nm less than 0.13 dB/km. For example, in one embodiment, the fiber 10 has a fictive temperature less than 1350° C. and attenuation at 1550 nm of about 0.13 dB/km. For example, in one embodiment, the fiber has a fictive temperature less than 1250° C. and attenuation at 1550 nm of about 0.13 dB/km.

According to some embodiments the optical fiber has a mode field diameter (MFD) of 8.2 microns <MFD<9.5 microns at a wavelength of 1310 nm; a 22 meter cable cutoff is <1260 nm; and attenuation <0.183 dB/km at 1550 nm. According to at least some embodiments the optical fiber comprising glass core containing $GeO_2$ surrounded by silica based cladding and fiber has a fictive temperature less than 1450° C. and attenuation at 1550 nm of less than 0.18 dB/km. According to some embodiments the fictive temperature of the fiber is less than 1300° C., or even less than 1200° C. For example, according to some embodiments the fictive temperature of the fiber may be 900° C. to 1400° C. or be 900° C. to 1300° C. °, or be 900° C. to 1250° C. In one embodiment, the fiber has a fictive temperature less than 1250° C. and attenuation at 1550 nm less than 0.13 dB/km. For example, in one embodiment, the fiber has a fictive temperature less than 1350° C. and attenuation at 1550 nm of about 0.13 dB/km. For example, in one embodiment, the fiber has a fictive temperature less than 1250° C. and attenuation at 1550 nm of about 0.13 dB/km.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of processing an optical fiber comprising the steps of:
   (i) drawing the fiber at a drawing rate of at least 30 m/sec; and
   (ii) cooling the fiber in a gas at an average cooling rate less than 5000° C./s, such that said cooling reduces the temperature of the fiber from an entering temperature in the range between 1500° C. and 1700° C. to another temperature in the range between 1200° C. and 1400° C., the gas being at a temperature between 800° C. and 1500° C.; and the thermal conductivity K of the gas being not greater than $1.5 \times 10^{-4}$ cal/cm-s-K for at least one temperature within a range of 800° C. to 1500° C. at 1 atm pressure absolute, and
   (iii) further comprising: cooling said fiber at a first cooling rate, said first cooling rate greater than 5000° C./s, said cooling at said first cooling rate reducing said fiber temperature from a first temperature $T_1$ to a second temperature $T_2$, such that $T_2<T_1$, said first temperature $T_1$ being in the range from 1800° C. to 2100° C. and said second temperature $T_2$, being in the range from 1600° C. to 1800° C.

2. The method according to claim 1, wherein: the average thermal conductivity of the gas is not greater than $1.5 \times 10^{-4}$ cal/cm-s-K within a temperature range of 800° C. to 1500° C. at 1 atm pressure absolute.

3. The method according to claim 1, wherein: the thermal conductivity κ of the gas is not greater than $1.6 \times 10^{-4}$ cal/cm-s-K for all temperatures within a range of 800° C. to 1500° C. at 1atm pressure absolute.

4. The method of claim 3, wherein the thermal conductivity κ of said gas at 1atm pressure absolute is not greater than $1.5 \times 10^{-4}$ cal/cm-s-K for all temperatures within a range of 800° C. to 1450° C.

5. The method of claim 1, wherein the gas is being at: (i) the temperature that is between 1000° C. and 1300° C., and (ii) pressure 0.025 to 1 atm absolute.

6. The method of claim 1, wherein the gas is Ar, Kr, Xe, or a mixture thereof; and the drawing rate is between 30 m/sec and 100 m/sec.

7. The method of claim 1, wherein the gas is Ar, Kr, Xe, or a mixture thereof; and the drawing rate is 40 m/sec to 100 m/sec, and said cooling in said gas is performed at the average cooling rate that is between 1000° C./s and 4000° C./s, at a pressure 0.025 to 1 atm, absolute.

8. The method of claim 1, wherein said entering temperature is higher than said another temperature by at least 100° C.

9. The method of claim 1, wherein said entering temperature is higher than said another temperature by at least ≥200° C.

10. The method of claim 1, wherein the drawing rate is between 40 m/sec and 100 m/sec.

11. The method of claim 1, wherein the cooling the fiber between said entering temperature and said another temperature is performed for more than 0.1 seconds.

12. The method of claim 1, wherein the cooling the fiber between said entering temperature and said another temperature is performed for more than 0.2 seconds.

13. The method of claim 1, wherein cooling the fiber between said entering temperature and said another temperature is performed for more than 0.3 seconds.

14. The method of claim 1, wherein the average cooling rate is between 1400° C./s and 3000° C./s.

15. The method of claim 1, wherein cooling the fiber includes passing the fiber through a treatment region, said treatment region having a temperature between 800° C. and 1300° C.

16. The method of claim 1, wherein said entering temperature ≤$T_2$.

17. A method of processing an optical fiber comprising:
   (i) providing the fiber drawn at a draw rate greater than 30 m/sec;
   (ii) cooling the fiber at a first cooling rate, said first cooling rate being greater than 5000° C./s, said cooling at the first cooling rate reducing fiber temperature from a first temperature $T_1$ to a second temperature $T_2$, such that $T_2<T_1$, the first temperature $T_1$ being in the range from 1800° C. to 2100° C. and the second temperature $T_2$, being in the range from 1600° C. to 1800° C.; and
   (iii) cooling said fiber in a gas at a second cooling rate, at a gas temperature between 800° C. and 1500° C., the second cooling rate being less than 5000° C./s, said cooling at said second cooling rate reducing the temperature of said fiber from a third temperature $T_3$ to a fourth temperature $T_4$, wherein $T_3 \leq T_2$, the third temperature $T_3$ being in the range from 1500° C. to 1700° C. and the fourth temperature $T_4$ being in the range from 1200° C. to 1400° C.; and wherein the thermal conductivity κ of the gas is not greater than $1.6 \times 10^{-4}$ cal/cm-s-K, for all temperatures between 800° C. and 1500° C. at 1atm pressure absolute.

18. The method of manufacturing an optical fiber comprising:
   (i) heating a fiber preform above its softening point,
   (ii) drawing the optical fiber from the heated preform at a draw rate of at least 30 m/sec; and
   (iii) passing the optical fiber through two treatment stages, such that
      a. the fiber enters a first treatment stage at a temperature between 1800° C. and 2100° C. and experiences an average cooling rate greater than 5000 ° C./s in the first treatment stage;
      b. the optical fiber exits the first treatment stage at a temperature between 1600° C. and 1800° C.;
      c. the optical fiber enters a second treatment stage downstream from the first treatment stage at a temperature between 1500° C. and 1700° C. and experiences an average cooling rate less than 5000° C./s in the second treatment stage in a gas or gas mixture having
         i. a temperature between 800° C. and 1500° C. and
         ii. a thermal conductivity κ that is not greater than $1.6 \times 10^{-4}$ cal/cm-s-K for all temperatures within a range of 800° C. to 1500° C. at 1 atm pressure absolute, and
      d. the optical fiber exits the second treatment stage at a temperature between 1200° C. and 1400° C.

19. The method of claim 18 further comprising: redirecting the fiber, after the fiber exits second treatment stage, with a fluid bearing device or an air-turn device.

20. The method of claim 18, wherein the fiber comprises:
   a silica based glass core containing at least one of: $GeO_2$, Cl, $K_2O$; the core having a relative refractive difference with respect to silica of 0.1% to 0.45%, the core having a residual stress that is a tensile stress with a value between 0 MPa and 15 MPa; and
   (ii) a silica based glass cladding surrounding the core; and a polymeric coating surrounding the cladding.

21. The method of claim 18, wherein said cladding has at least one region having a residual stress that is a tensile stress with a value between 5 MPa and 40 MPa.

22. The optical fiber made by the method of claim 18, wherein the fiber comprises:
   (i) a silica based glass core containing at least one of: $GeO_2$, Cl, $K_2O$; the core having a relative refractive difference with respect to silica of 0.1% to 0.45%, the core having a residual stress that is a tensile stress with a value between 0 and 15 MPA; and
   (ii) a silica based glass cladding surrounding the core having at least one region having a residual stress that is a tensile stress with a value between 5 MPa and 40 MPa;
   and a polymeric coating surrounding the cladding.

23. The optical fiber made by the method of claim 18, having a mode field diameter at 1310 nm between 8.2 microns and 9.5 microns, cable cutoff of less than 1260 nm and attenuation at 1550 nm of less than 0.18 dB/km.

24. The optical fiber of claim 18, comprising glass core containing at least one of: $GeO_2$, Cl, $K_2O$; and surrounded by silica based cladding; said optical fiber having a fictive temperature less than 1450° C. and has an attenuation at 1550 nm of less than 0.18 dB/km.

25. The optical fiber of clam 24, said core having a relative refractive difference with respect to silica of 0.1% to 0.45%, and at least one polymeric coating surrounding the cladding.

\* \* \* \* \*

UNITED STATES PATENT AND TRADEMARK OFFICE
CERTIFICATE OF CORRECTION

PATENT NO. : 9,932,260 B2
APPLICATION NO. : 15/337591
DATED : April 3, 2018
INVENTOR(S) : Kenneth Duane Billings et al.

It is certified that error appears in the above-identified patent and that said Letters Patent is hereby corrected as shown below:

In the Claims

Column 21, Line 17, Claim 1, delete "$1.5 \times 10^{-4}$" and insert -- $1.5 \times 10^{-4}$ --, therefor.

Column 21, Line 35, Claim 3, delete "1atm" and insert -- 1 atm --, therefor.

Column 21, Line 37, Claim 4, delete "1atm" and insert -- 1 atm --, therefor.

Column 22, Line 30, Claim 17, delete "1atm" and insert -- 1 atm --, therefor.

Column 22, Line 61, Claim 20, before "a silica" insert -- (i) --.

Column 23, Line 10, Claim 22, delete "MPA" and insert -- MPa --, therefor.

Column 23, Line 25, Claim 25, delete "clam" and insert -- claim --, therefor.

Signed and Sealed this
Fourth Day of October, 2022

Katherine Kelly Vidal
*Director of the United States Patent and Trademark Office*